(12) United States Patent
Cahall et al.

(10) Patent No.: US 7,061,695 B2
(45) Date of Patent: Jun. 13, 2006

(54) THREE ELEMENT OPTICAL SYSTEM

(75) Inventors: Scott C. Cahall, Fairport, NY (US); Carl Frederick Leidig, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/974,630

(22) Filed: Oct. 27, 2004

(65) Prior Publication Data
US 2005/0094292 A1 May 5, 2005

Related U.S. Application Data

(60) Provisional application No. 60/517,242, filed on Nov. 4, 2003.

(51) Int. Cl.
*G02B 9/14* (2006.01)
*G02B 13/18* (2006.01)
*G02B 3/02* (2006.01)

(52) U.S. Cl. .................... 359/785; 359/716
(58) Field of Classification Search ............ 359/785, 359/753, 749, 716, 708, 738–740
See application file for complete search history.

(56) References Cited

U.S. PATENT DOCUMENTS

| | | | |
|---|---|---|---|
| 4,620,775 A * | 11/1986 | Fujioka | 359/785 |
| 5,251,069 A | 10/1993 | Izuka | |
| 5,572,369 A * | 11/1996 | Estelle et al. | 359/785 |
| 5,677,798 A | 10/1997 | Hirano et al. | |
| 5,812,327 A | 9/1998 | Doh | |
| 6,097,551 A | 8/2000 | Kreitzer | |
| 6,181,477 B1 | 1/2001 | Okajima | |
| 6,282,033 B1 | 8/2001 | Ning | |
| 6,414,802 B1 | 7/2002 | Betensky | |
| 6,441,971 B1 | 8/2002 | Ning | |
| 6,476,982 B1 | 11/2002 | Kawakima et al. | |
| 6,515,809 B1 | 2/2003 | Kohno | |
| 6,560,037 B1 | 5/2003 | Dou | |
| 2002/0018303 A1 | 2/2002 | Kojima et al. | |
| 2003/0016452 A1 | 1/2003 | Sayag | |
| 2003/0048549 A1 | 3/2003 | Sato | |
| 2004/0179274 A1* | 9/2004 | Amanai | 359/785 |

FOREIGN PATENT DOCUMENTS

| | | | |
|---|---|---|---|
| JP | 10-301022 | * 11/1998 | |
| JP | 2002162561 | 9/2001 | |

OTHER PUBLICATIONS

Beecroft et al., "Nanocomposite Materials for Optical Applications", 1997, Chem. Matter, 9, 1302-1317.*

* cited by examiner

*Primary Examiner*—Alicia M Harrington
(74) *Attorney, Agent, or Firm*—William R. Zimmerli

(57) ABSTRACT

An optical system is provided. In order from an object side to an image side, the optical system includes a first lens element having a positive power, a meniscus shape, and an object side surface. The object side surface of the first lens element is convex toward the object side. A second lens element has a negative power, a meniscus shape, and an object side surface. The object side surface of the second lens element is concave toward the object side. A third lens element has a positive power. An aperture stop is positioned on or in front of an object side of the first lens element.

30 Claims, 20 Drawing Sheets

THREE ELEMENT OPTICAL SYSTEM

CROSS REFERENCE TO RELATED APPLICATIONS

This is a 111A application of commonly assigned Provisional Application Ser. No. 60/517,242 filed Nov. 4, 2003, entitled "THREE ELEMENT OPTICAL SYSTEM" in the name of Scott C. Cahall et al.

FIELD OF THE INVENTION

The present invention relates generally to optical systems and, more particularly, to optical systems having at least three lens elements useable with, for example, light sensitive receivers and/or sensors.

BACKGROUND OF THE INVENTION

Optical systems useable with, for example, light sensitive receivers and/or sensors are known. For example, U.S. Pat. No. 6,560,037 discloses a single element lens with an aperture stop adjacent to a distal surface of the lens element. However, a single homogenous lens element such as that disclosed by U.S. Pat. No. 6,560,037 does not affect the degree of optical imaging correction required to produce the best resolution on sensors employing hundreds of thousands of pixels.

Optical systems having two lens groups or lens elements are also known. For example, two lens group or element reverse telephoto designs are disclosed in U.S. Pat. Nos. 5,677,798; 5,812,327; 6,181,477; 6,097,551; and US patent application US 2002/0018303. A typical reverse-telephoto lens configuration can be described as one where the first lens group or element is negative in power and the second lens group or element is positive in power, when proceeding sequentially from the most distal end of the lens to the sensor. This arrangement causes the back focus of the lens system to be longer than the focal length. The reverse-telephoto configuration is a design form that allows for a generous space between the sensor and the lens element most proximal to the sensor; this space is often used to position additional optics like infrared rejecting filters or a sensor protective plate. Additionally, the reverse-telephoto lens configuration may help reduce the magnitude of the oblique ray angles incident on the sensor.

Other two lens element designs are disclosed that are not of the aforementioned reverse-telephoto configuration. U.S. Pat. Nos. 5,251,069; 6,515,809; US patent application 2003/0016452; US patent application 2003/0048549 are such examples of non reverse-telephoto design forms comprised of two groups/elements. Although these latter design forms may not possess the same typical advantageous configuration of a reverse-telephoto lens, they emphasize other aspects of improvement like enhanced manufacturability, reduced cost or more compact size. In optical systems where there is little need for a space behind the lens for a thick plate or a stringent requirement on limiting the angle at which the chief ray is incident upon a sensor, the non reverse-telephoto design forms may be preferable. However, there is a limitation with any two group/element design form; image quality will generally be less than what it could be with three or more lens groups/elements. For compact lenses designed for miniature sensors with typically a million pixels or more, designs of three or more lens elements may be desirable to achieve a suitably high image resolution.

Optical systems having at least three lens elements are also known. U.S. Pat. Nos. 6,441,971 B2; 6,282,033; 6,414,802; 6,476,982; and JP2002162561 disclose three and four lens element/group systems designed for imaging with sensors, generally with an aperture stop at or near the most distal surface of the lens from the sensor.

Designs like those disclosed in U.S. Pat. Nos. 6,282,033, 6,414,802, 6,476,982, and JP2002162561 are generally of the type comprised of four or more discrete lens elements that are assembled into at least three groups with an aperture of F/4 or less. Although excellent image quality may often be obtained with a sufficient number of optical surfaces, designs like these are expensive because of the number of lens elements that need to be manufactured and assembled versus designs with fewer elements. Furthermore, for a given application, it is difficult to achieve a short overall lens length when more lens elements are used. A useful figure-of-merit in comparing the shortness of lens designs is the ratio of the overall system length L, from the most distal vertex to the image plane, to the effective focal length of the lens $f_0$. Applying this metric, U.S. Pat. No. 6,282,033 discloses a lens with an overall system length of about 8 mm and a focal length of about 4.5 mm. The ratio of the overall system length to focal length for this lens is then a little less than 2. Furthermore, the preferred embodiment for U.S. Pat. No. 6,282,033 is one comprising lenses all made from glass with spherical surfaces. The expense of making all elements from glass exceeds the cost of making elements from resin materials in high volume production. Designs like those disclosed in U.S. Pat. No. 6,476,982 and JP2002162561 consider hybrid glass-plastic forms with the use of aspheric surfaces for aberration correction on the plastic lens elements. JP2002162561 discloses lenses with focal lengths of approximately 5.6 mm and with overall system lengths a little greater than 10 mm; consequently, the ratio of overall system length to focal length is a little less than 2. U.S. Pat. No. 6,476,982 discloses lenses with focal lengths of approximately 5.7 mm and with overall system lengths of approximately 7.35 mm, consequently, the ratio of overall system length to focal length is approximately 1.3. Designs like those disclosed U.S. Pat. No. 6,414,802 B1 are comprised of all plastic elements. The overall system lengths of disclosed lenses are as low as 15 mm for a focal length of 10 mm; consequently, the ratio of overall system length to focal length is approximately 1.5. These lenses are deficient in the area of minimizing the ratio of overall system length to focal length partly because of the use of many lens elements and the inability to compress the design into short lengths.

Other lens designs, like those disclosed in U.S. Pat. No. 6,441,971, are comprised of just three lens elements and have a relatively high light-collecting aperture of F/2.8 and wide field of view. The use of just three lens elements facilitates a more compact design than the lenses employing more elements. The designs disclosed in U.S. Pat. No. 6,441,971 have a ratio of overall system length to focal length of approximately 1.25. Achieving this relatively short length is partly achieved by choice of lens materials. The disclosed designs utilize a positive power glass lens element in the most distal position from the sensor with index of refraction greater than those typical for most plastics and many glasses. For example, SK16 with $N_d$=1.62041 or C-ZLAF2 with $N_d$=1.80279 are used in the disclosed designs, whereas most common plastics like acrylic and polystyrene have $N_d$<1.6. Additionally, the least expensive glass material type, BK7, has $N_d$=1.517. The refractive power of an air-material interface is greater when the index of refraction is higher and facilitates the design of a more compact system because lens thicknesses can generally be reduced; however, this design advantage comes at the expense of fabrication and material cost for the glass element(s). Designs that use the less expensive plastic resins with $N_d<1.6$ (e.g., acrylic, polycarbonate) or that include one lens element using the least expensive type glass (e.g. BK7) will generally have a lower overall cost.

The designs disclosed in U.S. Pat. No. 6,441,971 are disadvantaged in that they do not solve a problem that is important to the function of many sensors; namely, a significant reduction in the angles of rays incident upon the sensor. These designs have angles that exceed 20 degrees. It is important to reduce the angles of rays incident upon the sensor for several reasons. One is that it helps to improve the illumination uniformity on the sensor such that the corners are illuminated adequately relative to the center. Additionally, any dichroic-type filters (such as some infrared light rejection filters) will have properties that change versus angle of incidence; it is desirable to minimize these differences. Also, oblique rays incident on a sensor with light-collecting lenses (i.e., a microlenslet array) can become a problem if light associated with one lenslet over a pixel becomes imaged onto an adjacent pixel.

To overcome these issues, it is generally desirable to have all ray angles incident upon the sensor as small as possible. This requirement is often simplified to a constraint on the maximum chief ray angle. The chief ray angle is set by the lens exit pupil location. Lenses with exit pupil locations approaching infinity provide chief ray angles approaching zero, and are commonly referred to as telecentric. Practically, lenses with a high degree of telecentricity tend to come with increased complexity and increased overall length. As these are both key drivers in many imaging applications (e.g., camera-enabled phones and PDAs), some compromise must be made between them and the degree of telecentricty for a given lens solution (while preferably keeping the maximum chief ray angle less than about 20 degrees).

SUMMARY OF THE INVENTION

According to a first aspect of the invention, in order from an object side to an image side, an optical system includes a first lens element having a positive power, a meniscus shape, and an object side surface. The object side surface of the first lens element is convex toward the object side. A second lens element has a negative power, a meniscus shape, and an object side surface. The object side surface of the second lens element is concave toward the object side. A third lens element has a positive power. An aperture stop is positioned on or in front of an object side of the first lens element.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
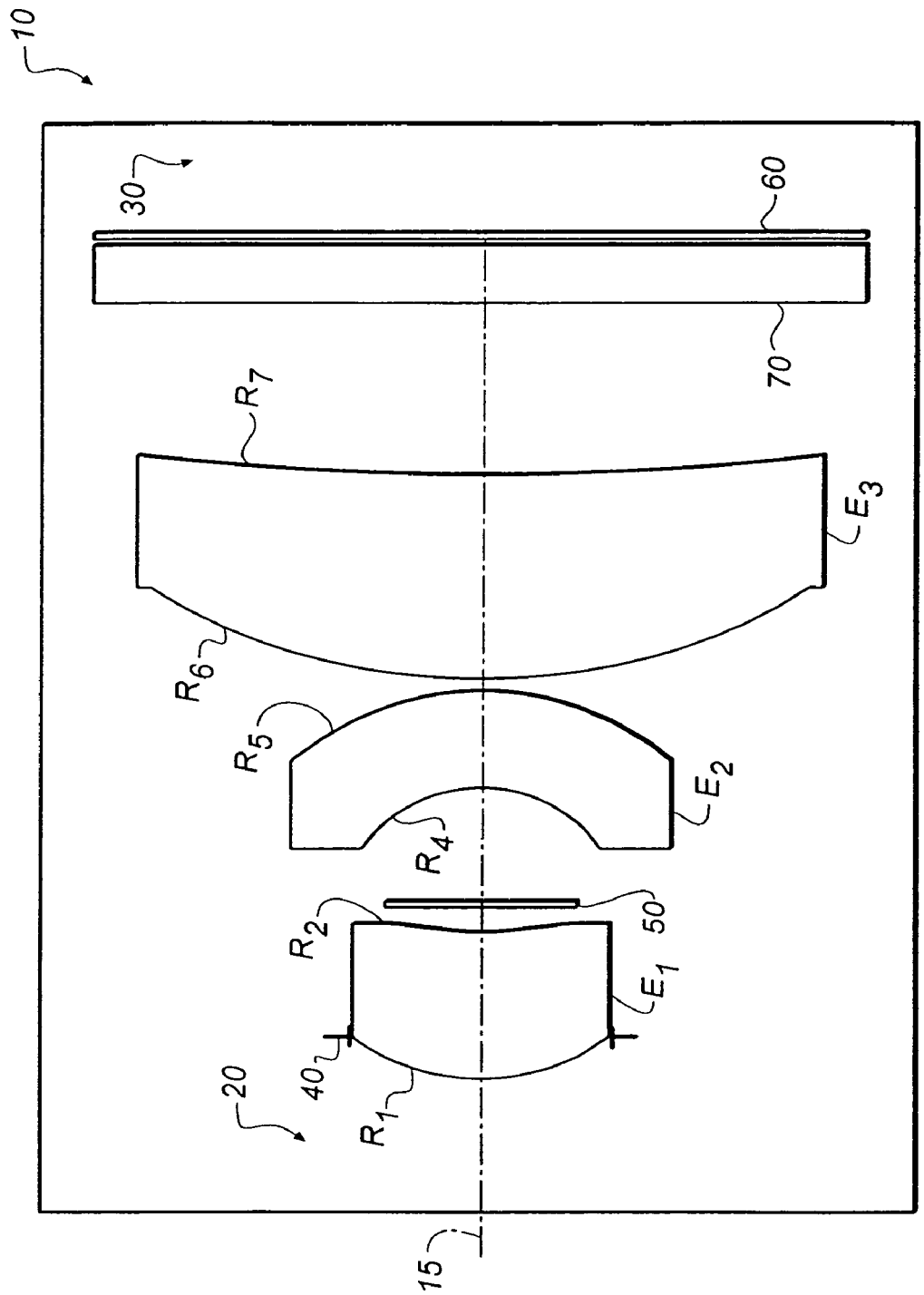
FIG. 1 is a schematic cross sectional view of a first example embodiment of the optical system.

The present description will be directed in particular to elements forming part of, or cooperating more directly with, apparatus in accordance with the present invention. It is to be understood that elements not specifically shown or described may take various forms well known to those skilled in the art.

The example embodiments of the invention are illustrated in FIGS. 1–10, and Tables 1–10, respectively. In FIGS. 1–10 and Tables 1–10, an optical system 10 includes three lens elements $E_1$, $E_2$, and $E_3$ arranged in order, along an optical axis 15, from an object side 20 of the optical system 10 to an image side 30 of the optical system 10. An aperture stop 40 is located on an object side of lens element $E_1$ and at least one baffle 50 is located between lens elements $E_1$ and $E_2$. A light sensitive receiver 60, for example, an image sensor or film, is located on an image side of lens element $E_3$. An additional element 70, for example, a cover plate and/or filter, is located between light sensitive receiver 60 and lens element $E_3$. Typical filters include infrared light rejection filters and/or light blurring filters (e.g. low-pass filters, band pass filters, etc.). The surface radii R of each lens element $E_1$, $E_2$, and $E_3$ of optical system 10 are numbered beginning at the object side 20 and ending on the image side 30. In Tables 1–10, the thicknesses $T_n$ of the lens elements and the airspaces between the lens elements are both labeled as "thickness" and are listed on the same line as the surface preceding the thickness. For example, the first thickness in Table 1 corresponds to the thickness of lens element $E_1$. Similarly, the second thickness in Table 1 corresponds to the airspace between lens element $E_1$ and baffle 50. All thicknesses provided in Tables 1–10 are in millimeters. All indices and V-numbers (also known as Abbe numbers) are for the helium d line of the spectrum at a wavelength of 587.6 nm.

Figure 2:
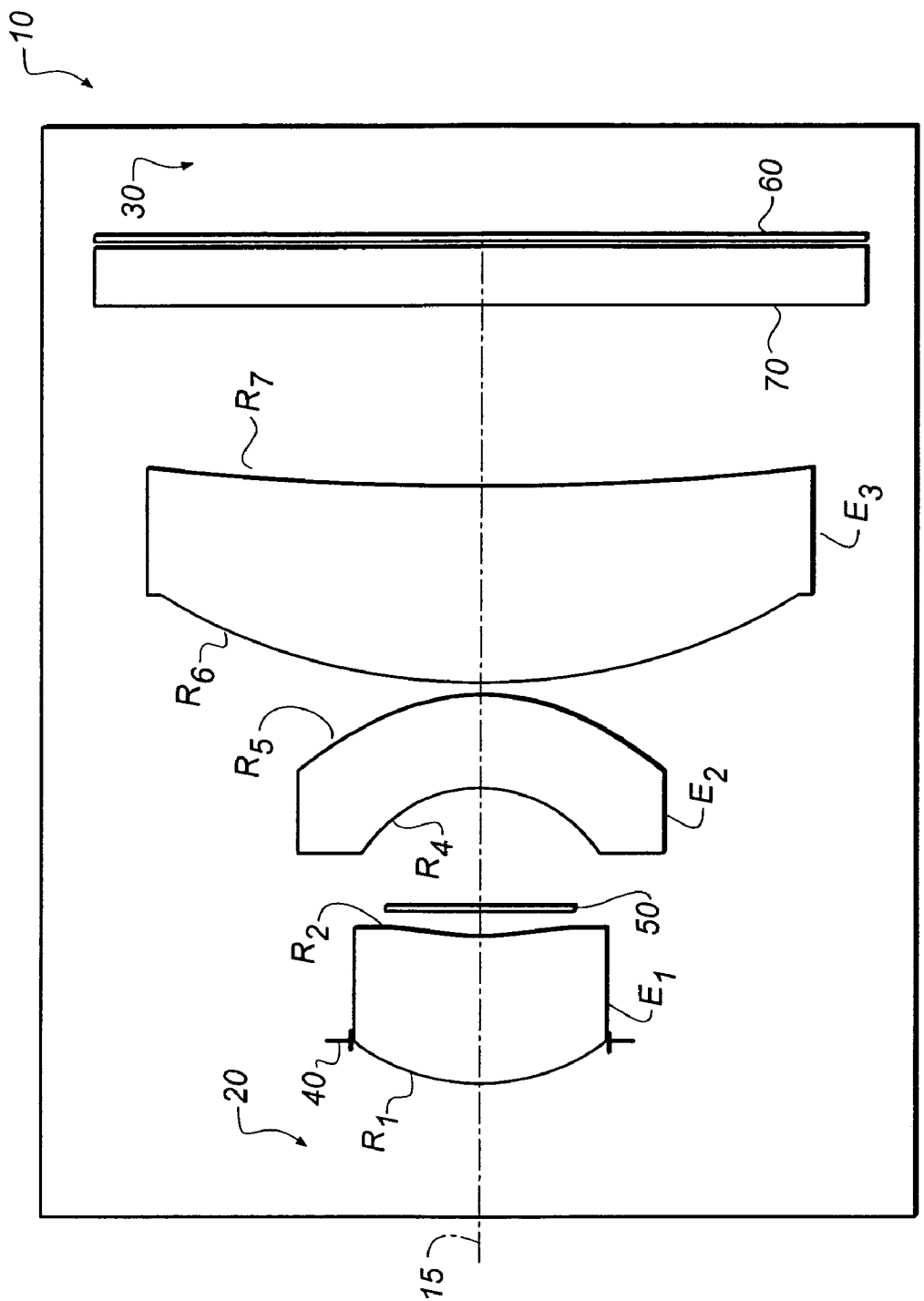
FIG. 2 is a schematic cross sectional view of a second example embodiment of the optical system.

Referring to FIGS. 1 and 2 and Tables 1 and 2, respectively, first and second example embodiments are shown. Optical system 10 includes from object side 20 to image side 30 lens elements $E_1$, $E_2$, and $E_3$. Lens element $E_1$ is a spherical singlet lens element having a positive power and a meniscus shape convex toward the object side 20. Lens element $E_2$ is a bi-aspheric singlet lens element having a negative power and a meniscus shape concave toward the object side 20. Lens element $E_3$ is a spherical singlet lens element having a positive power.

Aperture stop 40 is located on the object side surface of lens element $E_1$. Alternatively, aperture stop 40 can be located spaced apart from the object side surface of lens element $E_1$. Baffle 50, for example, a light vignetting aperture, is located between lens elements $E_1$ and $E_2$. Alternatively, baffle 50 can be positioned on a surface of either or both of lens element $E_1$ and $E_2$.

Lens elements $E_1$, $E_2$, and $E_3$ are made from glass, resin material (e.g. plastic), and resin material, respectively. However other material combination are possible. For example, lens elements $E_1$, $E_2$, and $E_3$ can be made from glass, resin material, and glass, respectively. Alternatively, lens elements $E_1$, $E_2$, and $E_3$ can be made from resin material, resin material, and glass, respectively. Each lens element $E_1$, $E_2$, and $E_3$ can be made from resin materials. When a resin material is used, the resin material can be of the type having a glass transition temperature, $T_g > 300°$ F. Nanocomposite optical material can also be used in any one or all of lens elements $E_1$, $E_2$, and $E_3$.

The optical system 10 described in FIGS. 1 and 2 and Tables 1 and 2, respectively, has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens.

Lens element $E_1$, $E_2$, and/or $E_3$ can be made from very low dispersion material (for example, Abbe V-number, $V_d > 65$). For example, in the example embodiment shown in FIG. 2 and TABLE 2, lens element $E_1$ is spherical and made from very low dispersion material (Abbe V-number, $V_d > 65$, and more preferably Abbe V-number $V_d > 80$). Although similar to the embodiment shown in FIG. 1 and Table 1, the use of a very low dispersion material for lens element E1 improves the polychromatic performance of optical system 10.

Figure 3:
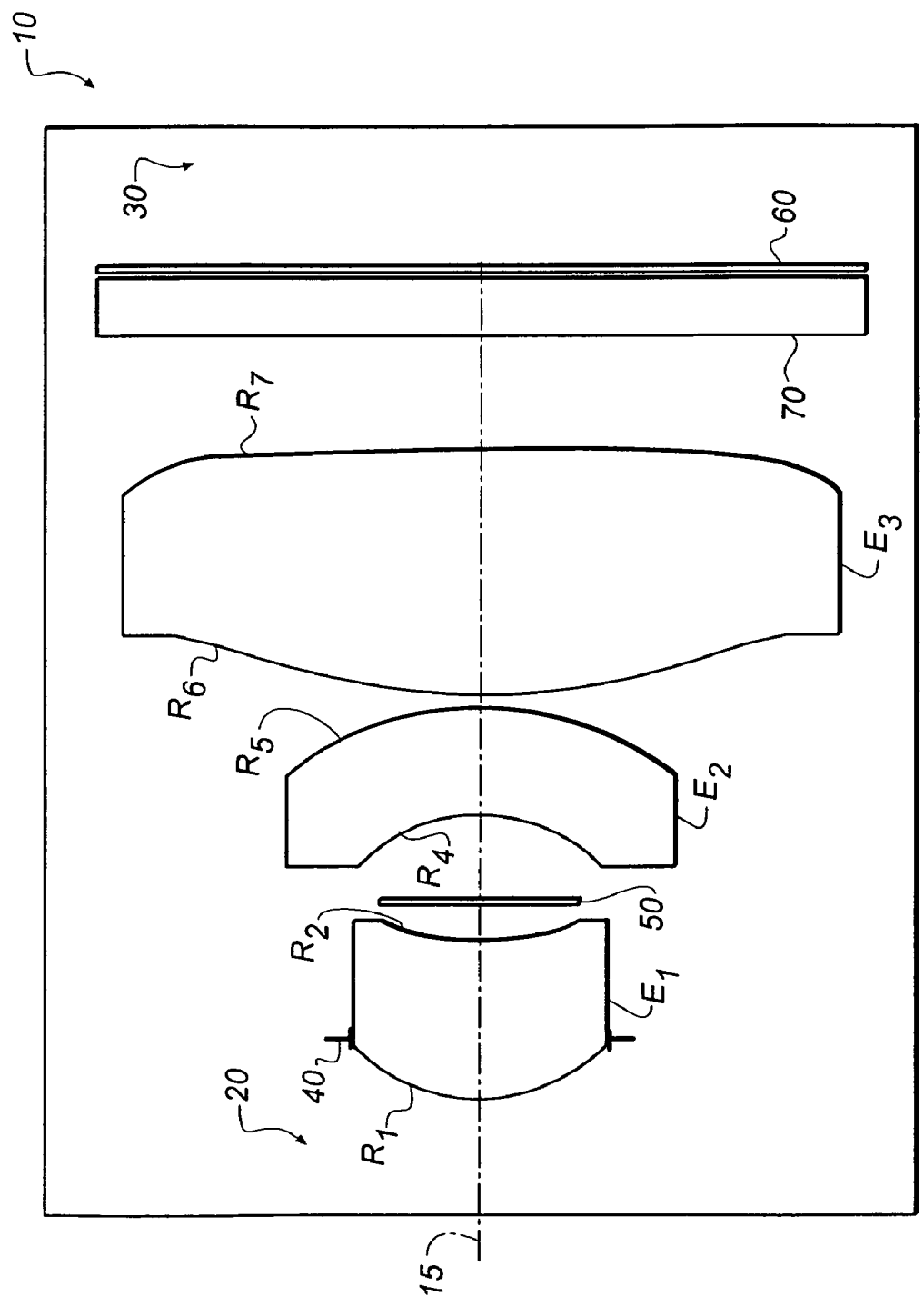
FIG. 3 is a schematic cross sectional view of a third example embodiment of the optical system.

Referring to FIG. 3 and Table 3, a third example embodiment is shown. Optical system 10 includes from object side 20 to image side 30 lens elements $E_1$, $E_2$, and $E_3$. Lens element $E_1$ is a bi-aspheric singlet lens element having a positive power and a meniscus shape convex toward the object side 20. Lens element $E_2$ is a spherical singlet lens element having a negative power and a meniscus shape concave toward the object side 20. Lens element $E_3$ is a bi-aspheric singlet lens element having a positive power.

Aperture stop 40 is located on the object side surface of lens element $E_1$. Alternatively, aperture stop 40 can be located spaced apart from the object side surface of lens element $E_1$. Baffle 50, for example, a light vignetting aperture, is located between lens elements $E_1$ and $E_2$. Alternatively, baffle 50 can be positioned on a surface of either or both of lens element $E_1$ and $E_2$.

Lens elements $E_1$, $E_2$, and $E_3$ are made from resin material (e.g. plastic), resin material, and resin material, respectively. However other material combinations are possible. For example, lens elements $E_1$, $E_2$, and $E_3$ can made from resin material, glass, and resin material, respectively. When a resin material is used, the resin material can be of the type having a glass transition temperature, $T_g > 300°$ F. Nanocomposite optical material can also be used in any one or all of lens elements $E_1$, $E_2$, and $E_3$. Alternatively, lens element $E_1$, $E_2$, and/or $E_3$ can be made from very low dispersion material (for example, Abbe V-number, $V_d > 65$).

The optical system 10 described in FIG. 3 Table 3, respectively, has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens.

Figure 4:
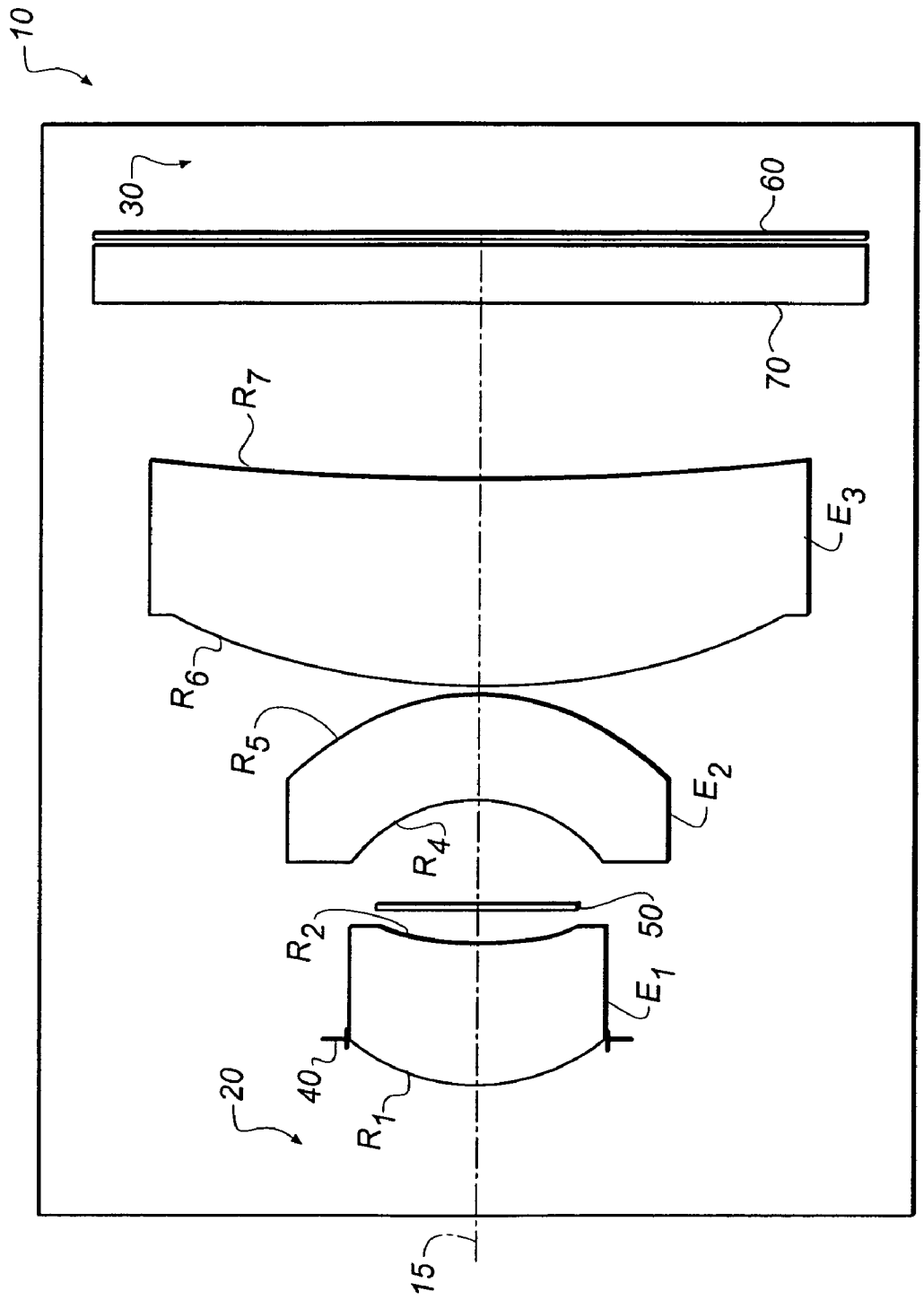
FIG. 4 is a schematic cross sectional view of a fourth example embodiment of the optical system.
Figure 5:
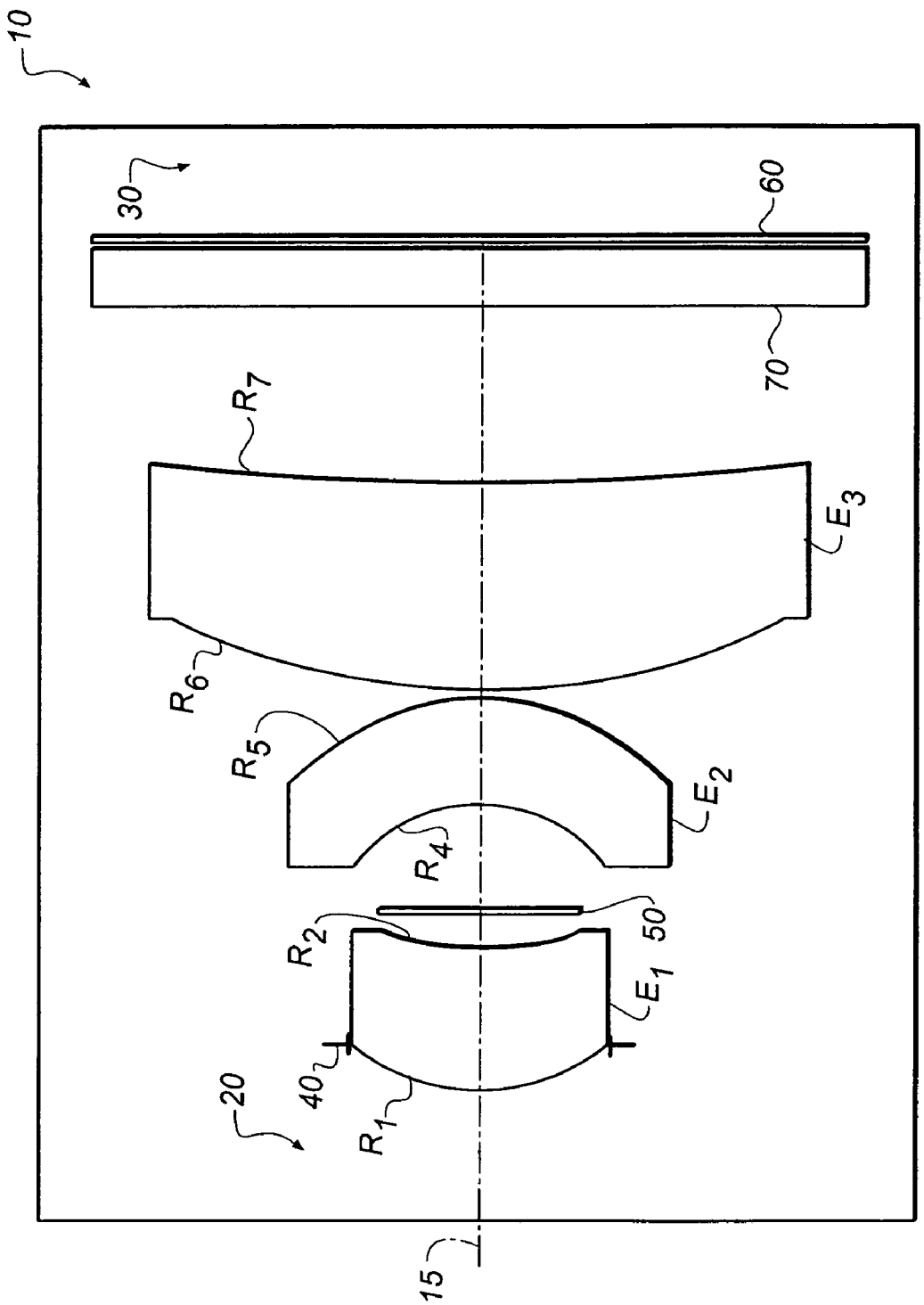
FIG. 5 is a schematic cross sectional view of a fifth example embodiment of the optical system.

Referring to FIGS. 4 and 5 and Tables 4 and 5, respectively, fourth and fifth example embodiments are shown. Optical system 10 includes from object side 20 to image side 30 lens elements $E_1$, $E_2$, and $E_3$. Lens element $E_1$ is a bi-aspheric singlet lens element having a positive power and a meniscus shape convex toward the object side 20. Lens element $E_2$ is a bi-aspheric singlet lens element having a negative power and a meniscus shape concave toward the object side 20. Lens element $E_3$ is a spherical singlet lens element having a positive power.

Aperture stop 40 is located on the object side surface of lens element $E_1$. Alternatively, aperture stop 40 can be located spaced apart from the object side surface of lens element $E_1$. Baffle 50, for example, a light vignetting aperture, is located between lens elements $E_1$ and $E_2$. Alternatively, baffle 50 can be positioned on a surface of either or both of lens element $E_1$ and $E_2$.

Lens elements $E_1$, $E_2$, and $E_3$ are made from resin material (e.g. plastic), resin material, and resin material, respectively. However other material combination are possible. For example, lens elements $E_1$, $E_2$, and $E_3$ can be made from resin material, resin material, and glass, respectively. Nanocomposite optical material can also be used in any one or all of lens elements $E_1$, $E_2$, and $E_3$. Alternatively, lens element $E_1$, $E_2$, and/or $E_3$ can be made from very low dispersion material (for example, Abbe V-number, $V_d > 65$).

The optical system 10 described in FIGS. 4 and 5 and Tables 4 and 5, respectively, has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens.

When a resin material is used, the resin material can be of the type having a glass transition temperature, $T_g > 300°$ F. For example, in the example embodiment shown in FIG. 5 and TABLE 5, all three lens elements $E_1$, $E_2$, and $E_3$ are made from resin materials of the type having a glass transition temperature, $T_g > 300°$ F., to allow for high temperature assembly operations, storage, or usage.

Figure 6:
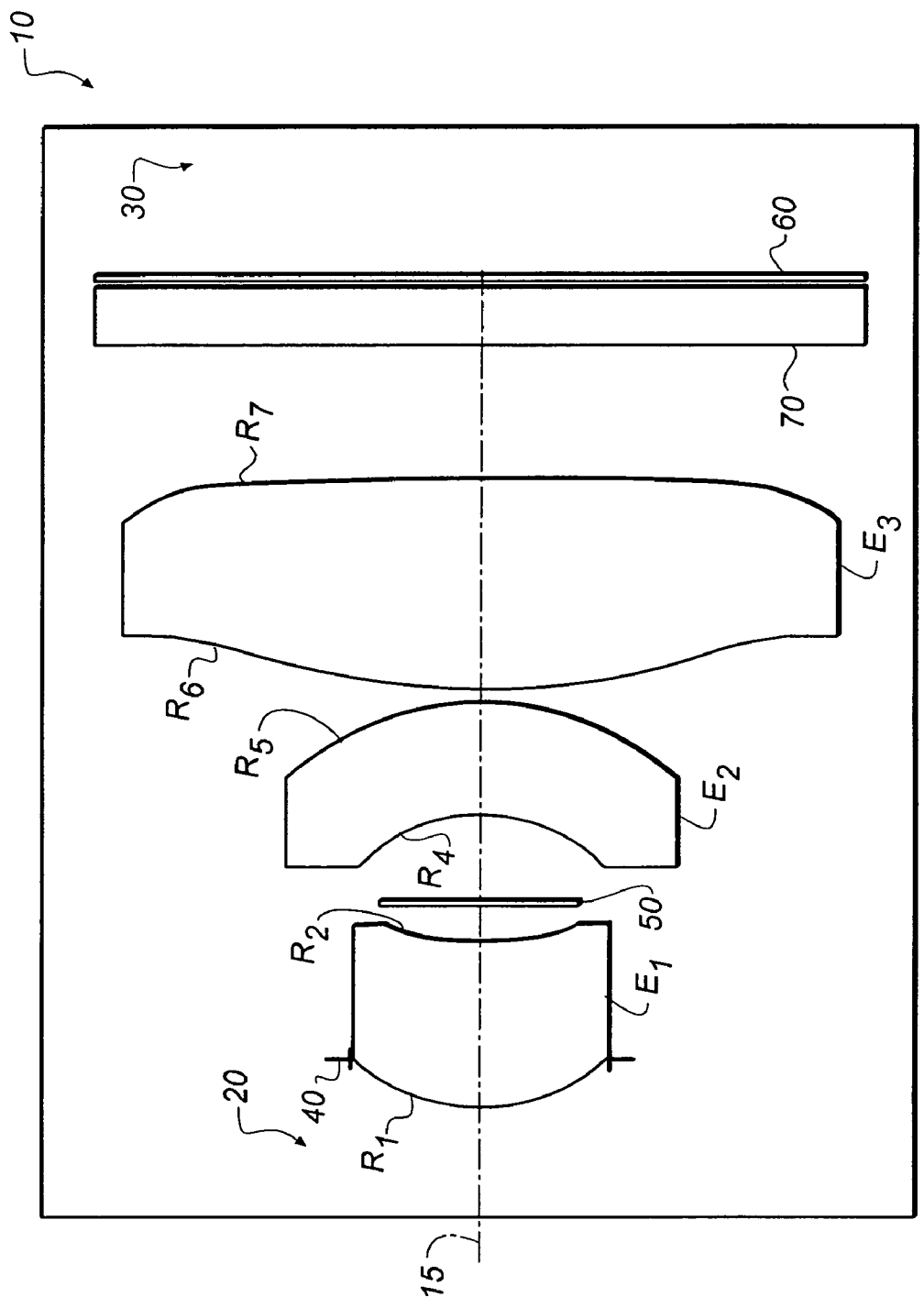
FIG. 6 is a schematic cross sectional view of a sixth example embodiment of the optical system.
Figure 7:
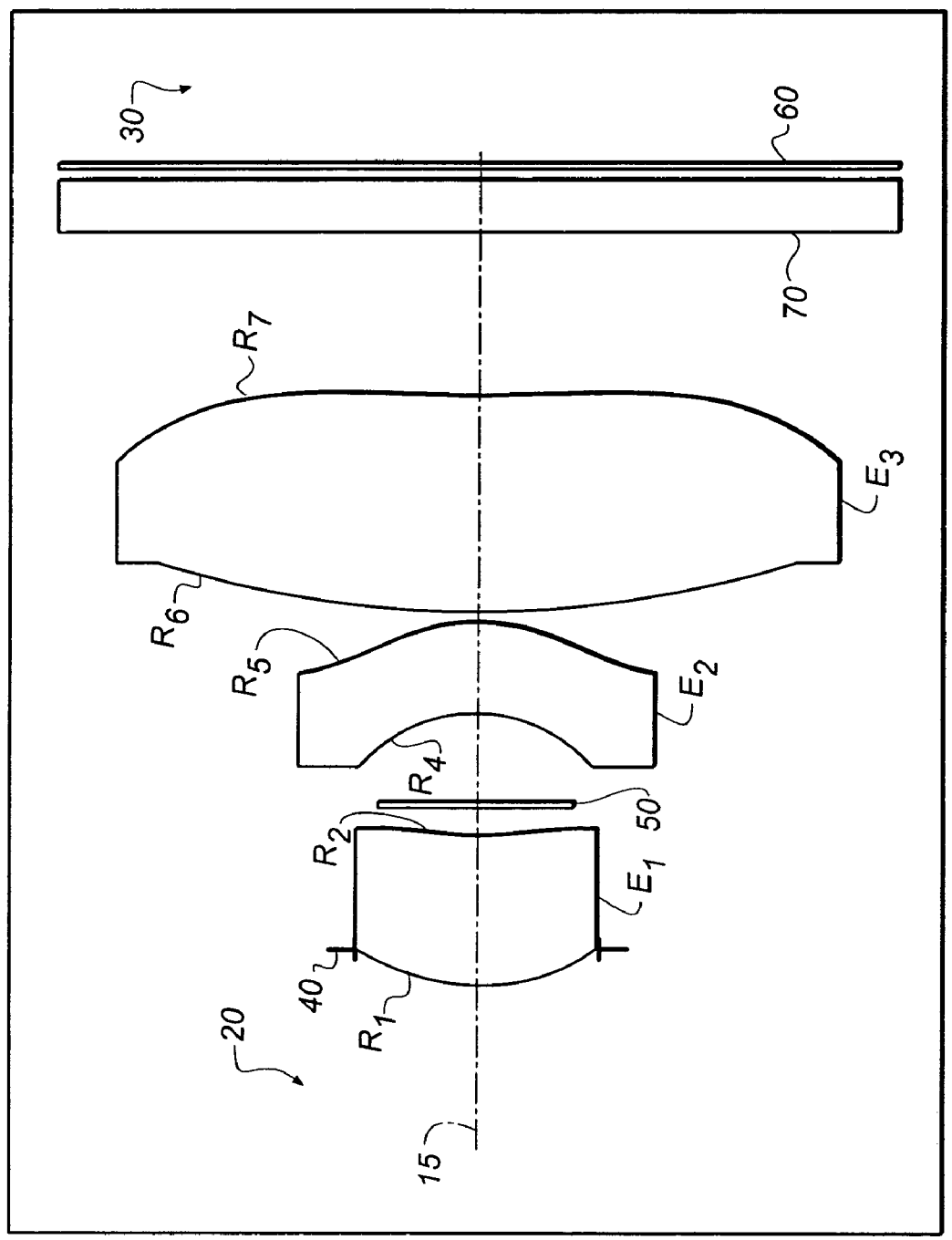
FIG. 7 is a schematic cross sectional view of a seventh example embodiment of the optical system.
Figure 8:
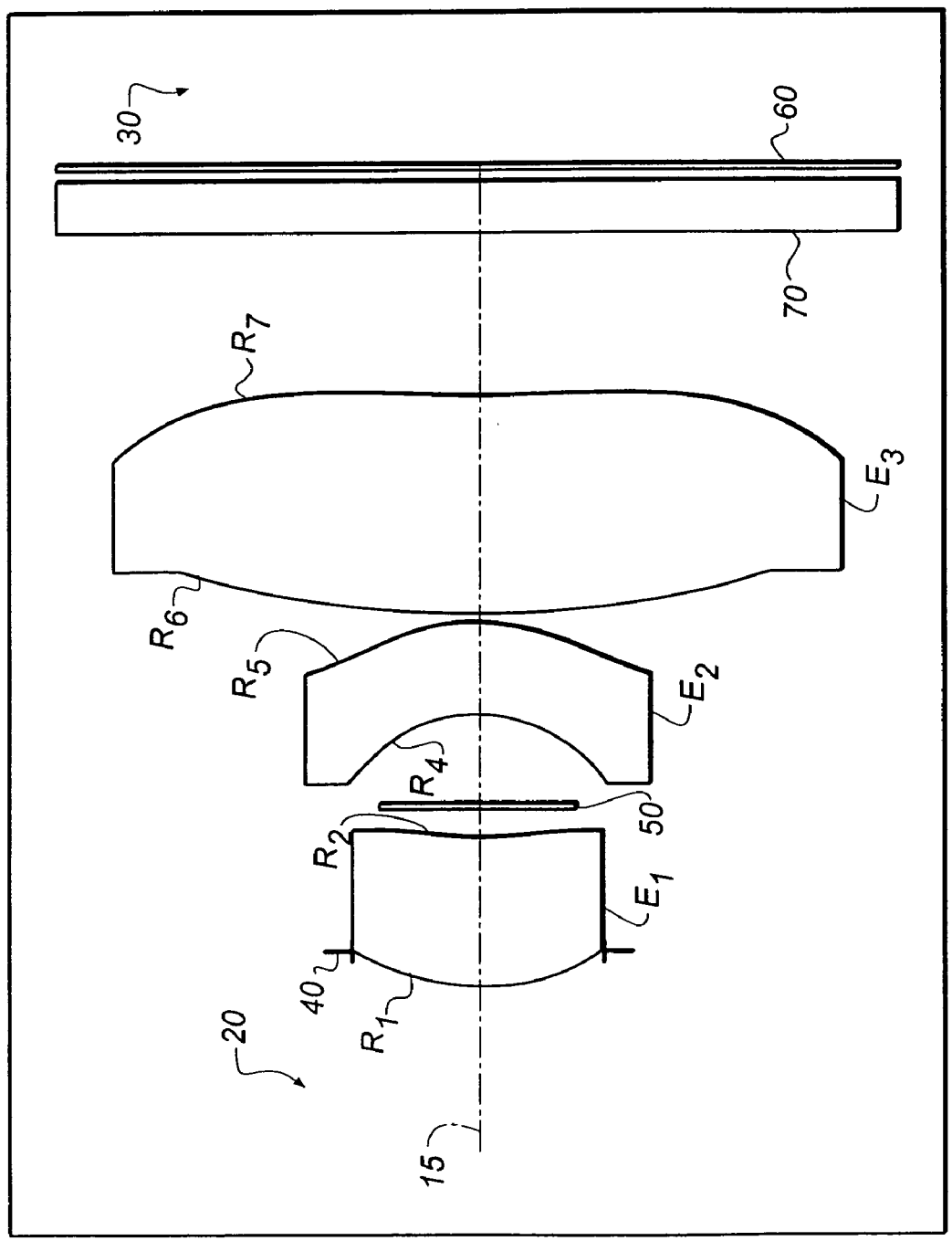
FIG. 8 is a schematic cross sectional view of an eighth example embodiment of the optical system.

Referring to FIGS. 6, 7, and 8 and Tables 6, 7, and 8, respectively, sixth, seventh, and eighth example embodiments are shown. Optical system 10 includes from object side 20 to image side 30 lens elements $E_1$, $E_2$, and $E_3$. Lens element $E_1$ is an aspheric singlet lens element having a positive power and a meniscus shape convex toward the object side 20. Either or both surfaces of lens element $E_1$ can be aspheric. Lens element $E_2$ is an aspheric singlet lens element having a negative power and a meniscus shape concave toward the object side 20. Either or both surfaces of lens element $E_2$ can be aspheric. Lens element $E_3$ is an aspheric singlet lens element having a positive power. Either or both surfaces of lens element $E_3$ can be aspheric.

Aperture stop 40 is located on the object side surface of lens element $E_1$. Alternatively, aperture stop 40 can be located spaced apart from the object side surface of lens element $E_1$. Baffle 50, for example, a light vignetting aperture, is located between lens elements $E_1$ and $E_2$. Alternatively, baffle 50 can be positioned on a surface of either or both of lens element $E_1$ and $E_2$.

Lens elements $E_1$, $E_2$, and $E_3$ are each made from resin materials (e.g. plastic). When a resin material is used, the resin material can be of the type having a glass transition temperature, $T_g > 300°$ F. Nanocomposite optical material can also be used in any one or all of lens elements $E_1$, $E_2$, and $E_3$. Alternatively, lens element $E_1$, $E_2$, and/or $E_3$ can be made from very low dispersion material (for example, Abbe V-number, $V_d > 65$).

The optical system 10 described in FIGS. 6, 7, and 8 and Tables 6, 7, and 8, respectively, has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens.

Referring back to FIGS. 1–8 and Tables 1–8, respectively, each example embodiment of optical system 10 has an overall system length L from the object side surface of lens element $E_1$ to light sensitive receiver 60 is about 6 mm and the effective focal length $f_0$ for each of these example cases is about 5 mm, giving an $L/f_0$ ratio less than 1.20. Each example embodiment covers a semi-field of view of at least 28 degrees, is F/2.8 or faster, has a relative illumination in the corner which is approximately 50% of the illumination at the center of the image (or more), has a maximum distortion magnitude less than 4%, and constrains the maximum chief ray angle at the light sensitive receiver 10 or sensor plane to less than about 20 degrees with respect to the sensor plane normal.

Figure 9:
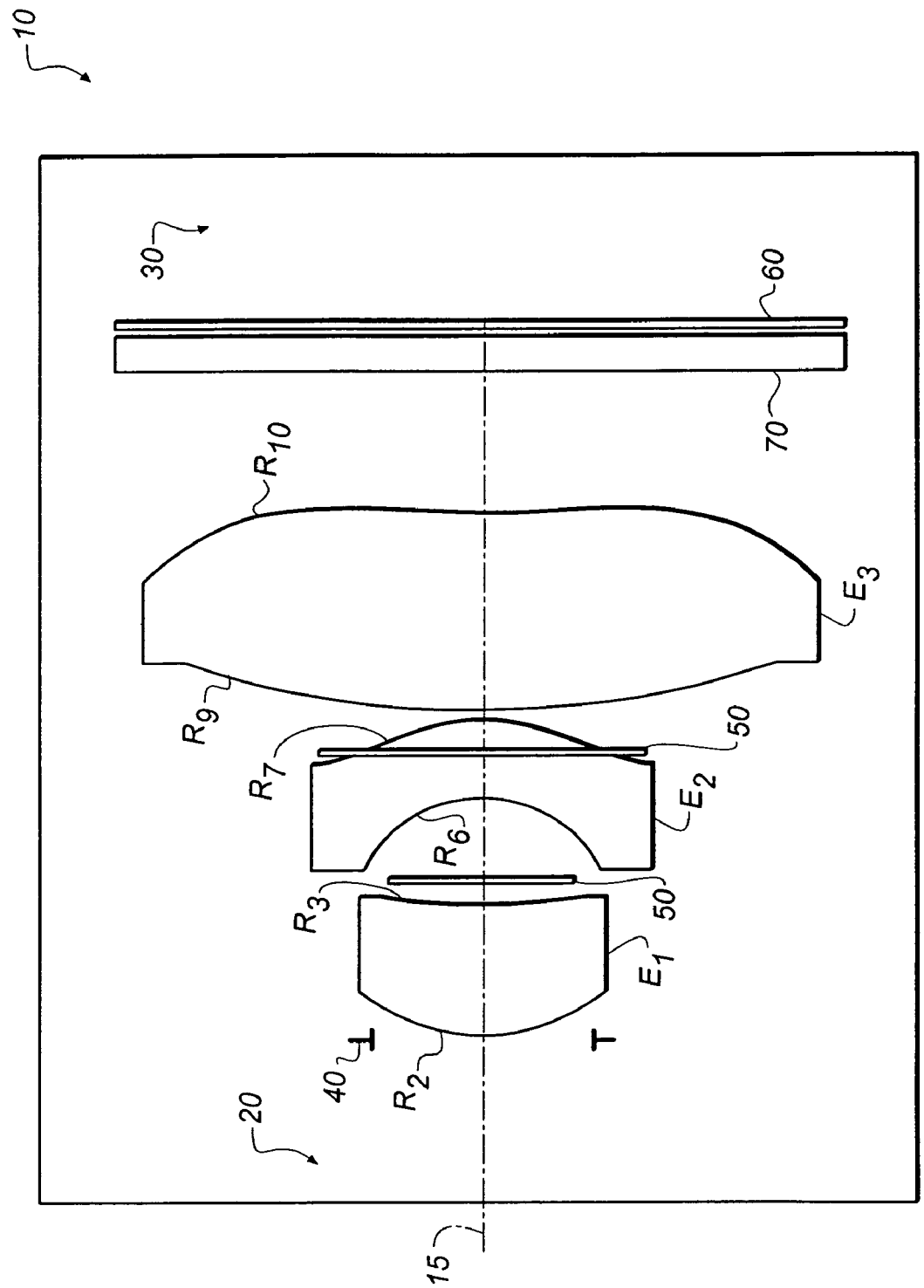
FIG. 9 is a schematic cross sectional view of a ninth example embodiment of the optical system.

Referring to FIG. 9 and Table 9, a ninth example embodiment is shown. Optical system 10 includes from object side 20 to image side 30 lens elements $E_1$, $E_2$, and $E_3$. Lens element $E_1$ is an aspheric singlet lens element having a positive power and a meniscus shape convex toward the object side 20. In this embodiment, the image side surface of lens element $E_1$ is aspheric; however either surface of lens element $E_1$ can be aspheric. Lens element $E_2$ is a bi-aspheric singlet lens element having a negative power and a meniscus shape concave toward the object side 20. Lens element $E_3$ is an aspheric singlet lens element having a positive power. In this embodiment, the image side surface of lens element $E_3$ is aspheric; however either surface of lens element $E_3$ can be aspheric.

Aperture stop 40 is located spaced apart from the object side surface of lens element $E_1$. Alternatively, aperture stop 40 can be located on the object side surface of lens element $E_1$. Baffle(s) 50, for example, a light vignetting aperture, is located between lens elements $E_1$ and $E_2$. Alternatively, baffle 50 can be positioned on a surface of either or both of lens element $E_1$ and $E_2$. Another baffle(s) 50, for example, a light vignetting aperture and/or a glare stop, is located on an image side surface of lens element $E_2$. Alternatively, this baffle(s) 50 can be located between lens elements $E_2$ and $E_3$ or on a surface of lens element $E_3$.

Lens elements $E_1$, $E_2$, and $E_3$ are each made from resin materials (e.g. plastic). When a resin material is used, the resin material can be of the type having a glass transition temperature, $T_g > 300°$ F. Nanocomposite optical material can also be used in any one or all of lens elements $E_1$, $E_2$, and $E_3$. Alternatively, lens element $E_1$, $E_2$, and/or $E_3$ can be made from very low dispersion material (for example, Abbe V-number, $V_d > 65$).

The optical system 10 described in FIG. 9 and Table 9 has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens. The optical system 10 has an overall system length L from the aperture stop 40 to light sensitive receiver 60 is about 6.3 mm and the effective focal length $f_0$ is about 5.3 mm, giving an $L/f_0$ ratio less than 1.20. This example embodiment covers a semi-field of view of at least 29 degrees, is F/2.8 or faster, has a relative illumination in the corner which is approximately 50% of the illumination at the center of the image (or more), has a maximum distortion magnitude less than 4%, and constrains the maximum chief ray angle at the light sensitive receiver 10 or sensor plane to less than about 22 degrees with respect to the sensor plane normal.

Figure 10:
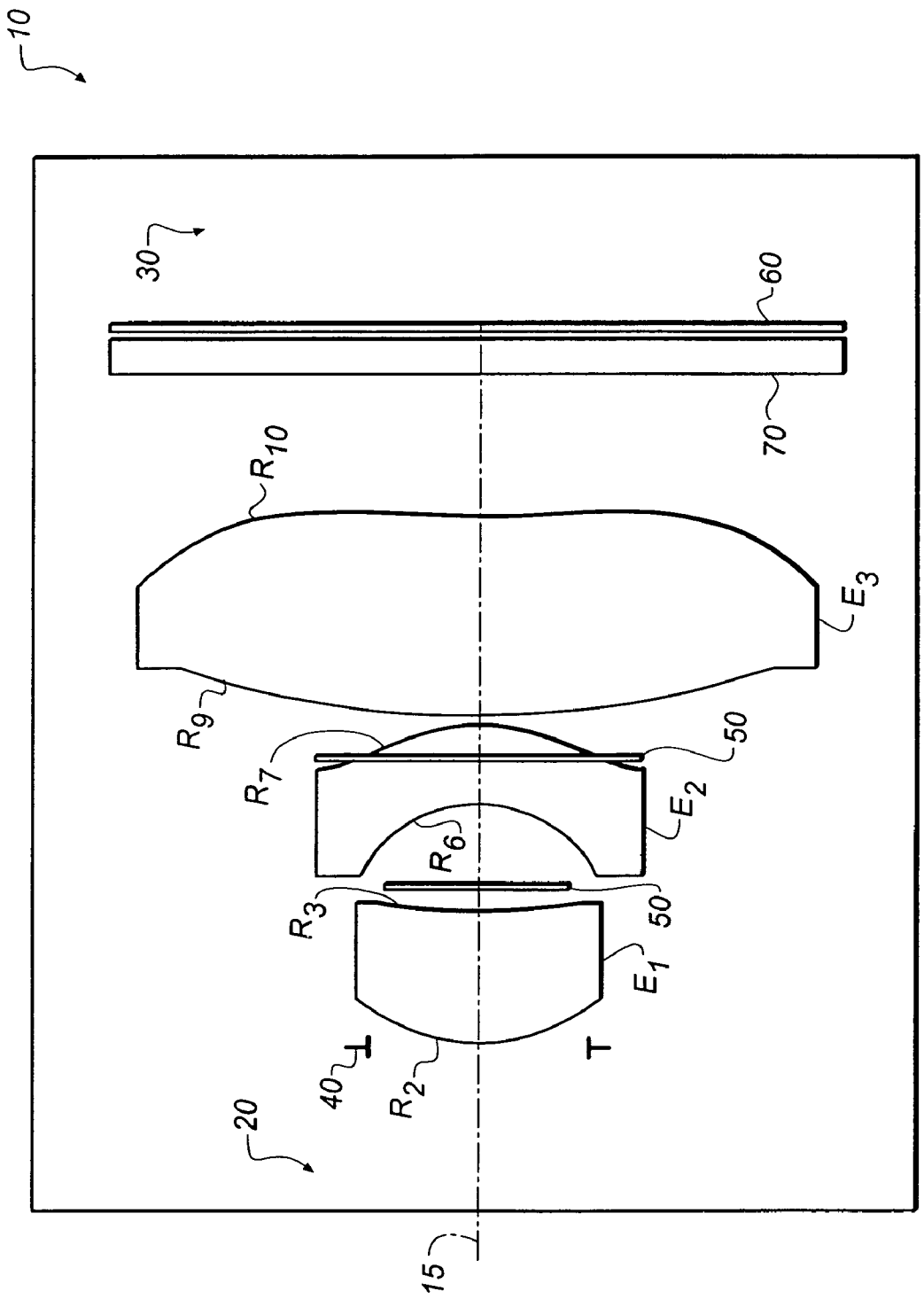
FIG. 10 is a schematic cross sectional view of a tenth example embodiment of the optical system.
Figure 11:
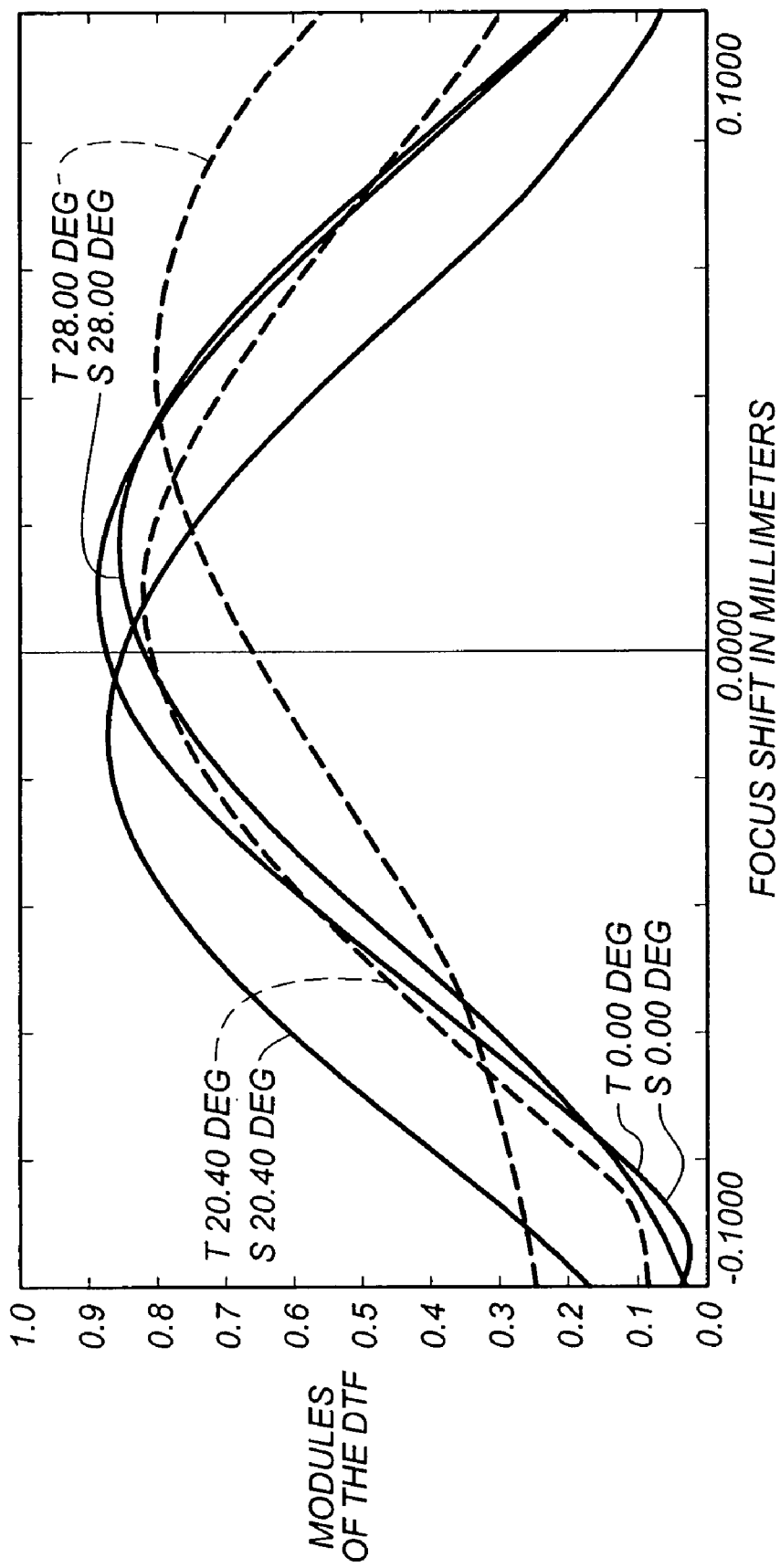
FIG. 11 is a through-focus MTF plot for the embodiment shown in FIG. 1.
Figure 12:
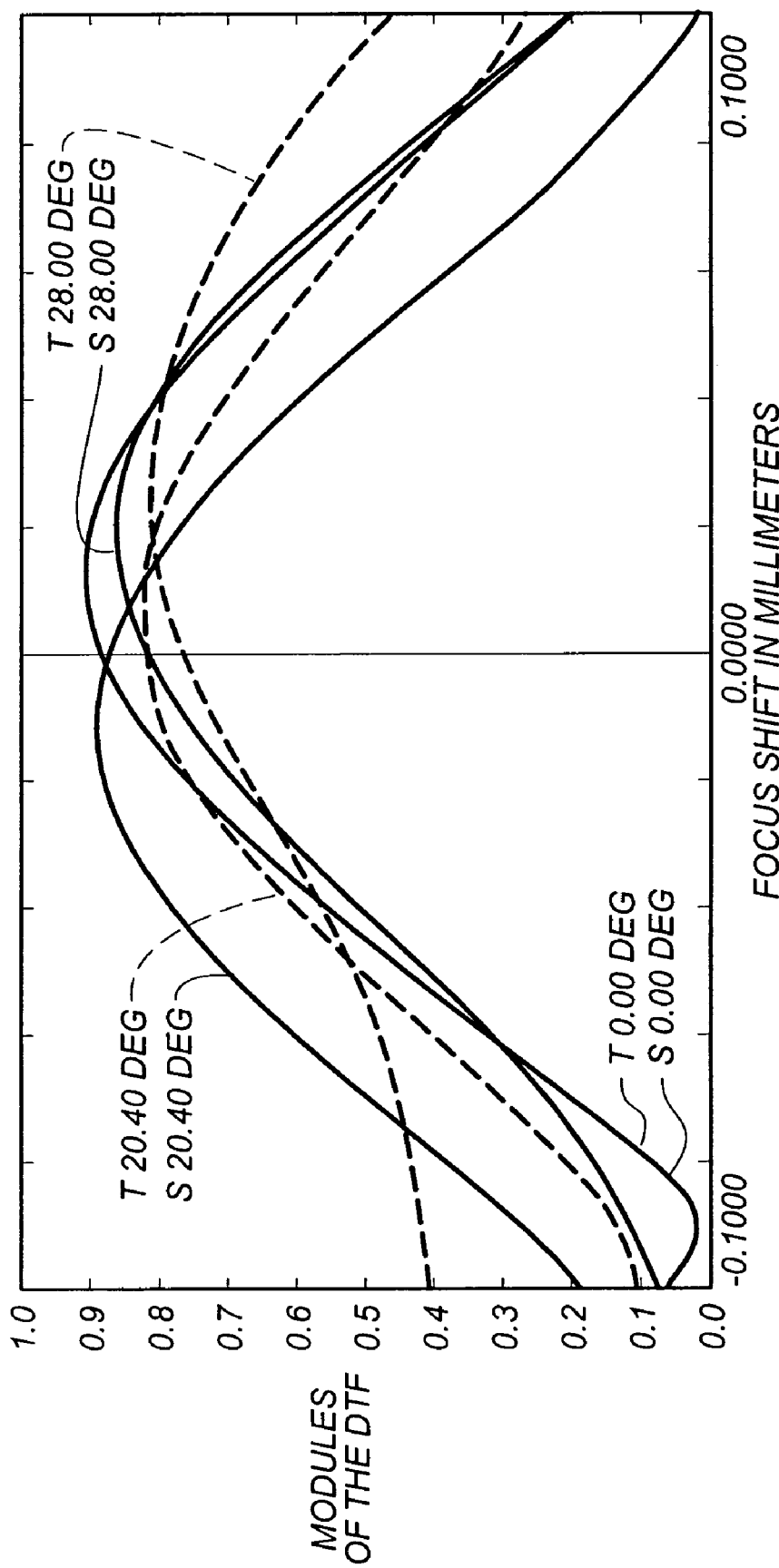
FIG. 12 is a through-focus MTF plot for the embodiment shown in FIG. 2.
Figure 13:
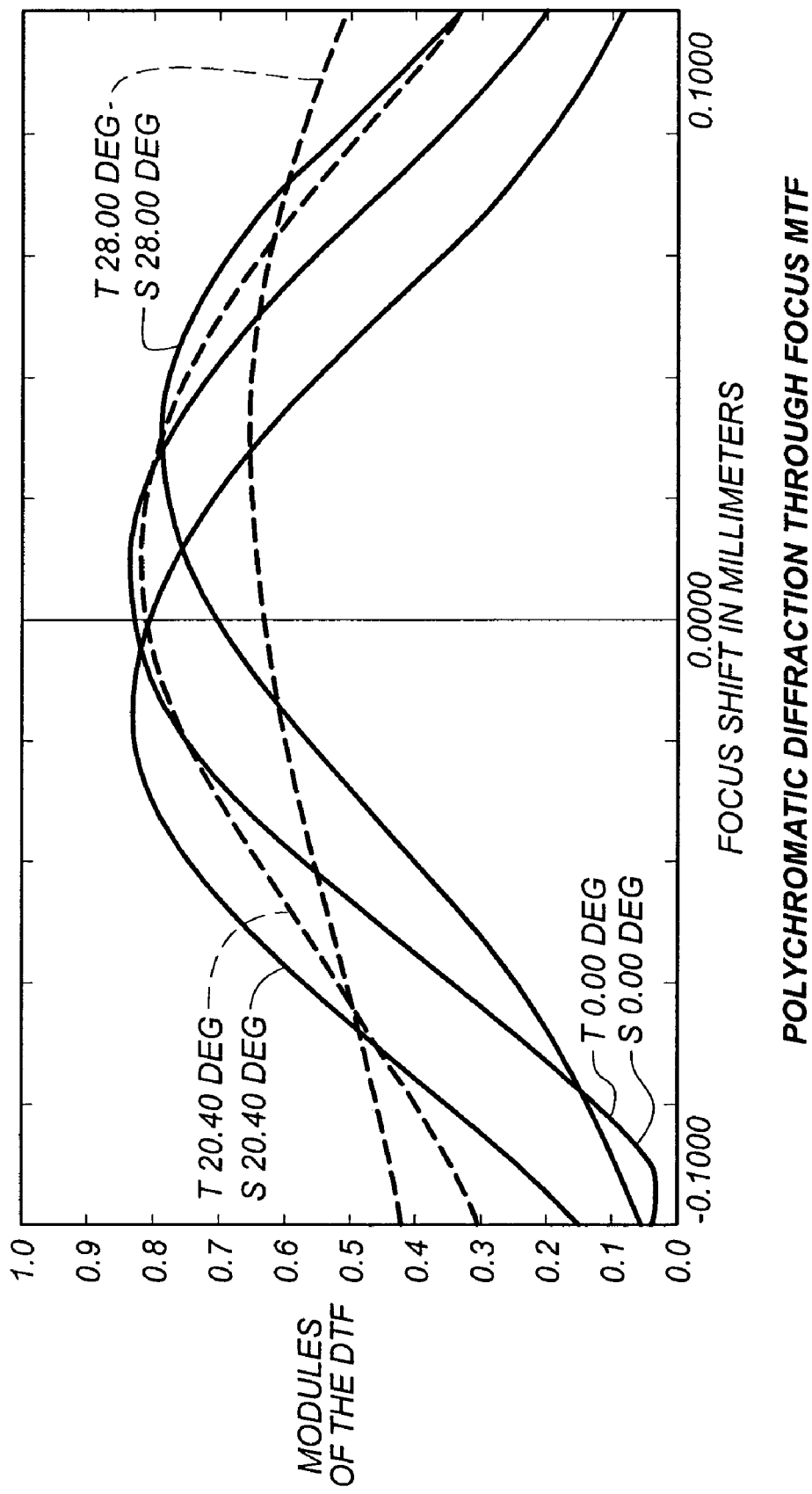
FIG. 13 is a through-focus MTF plot for the embodiment shown in FIG. 3.
Figure 14:
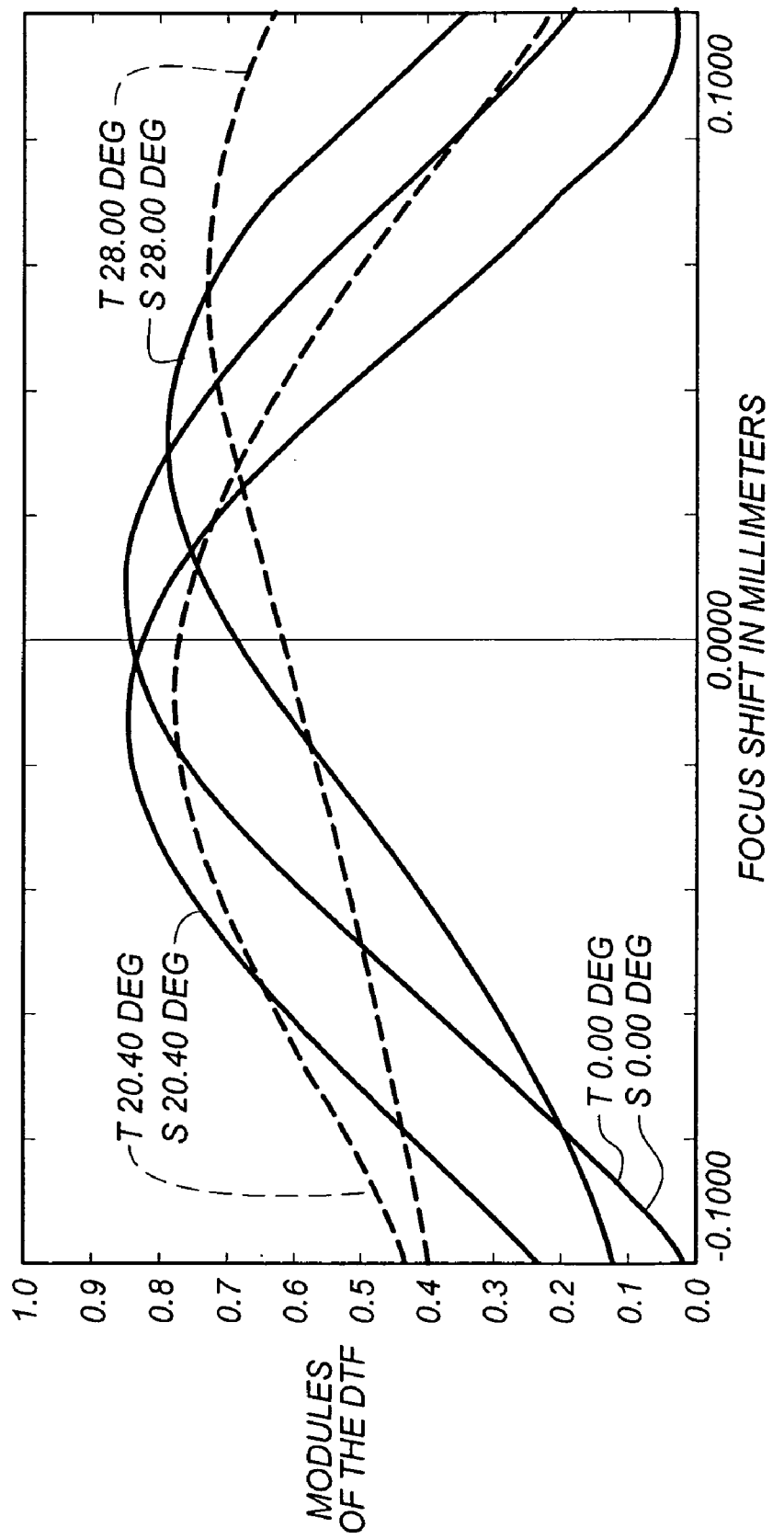
FIG. 14 is a through-focus MTF plot for the embodiment shown in FIG. 4.
Figure 15:
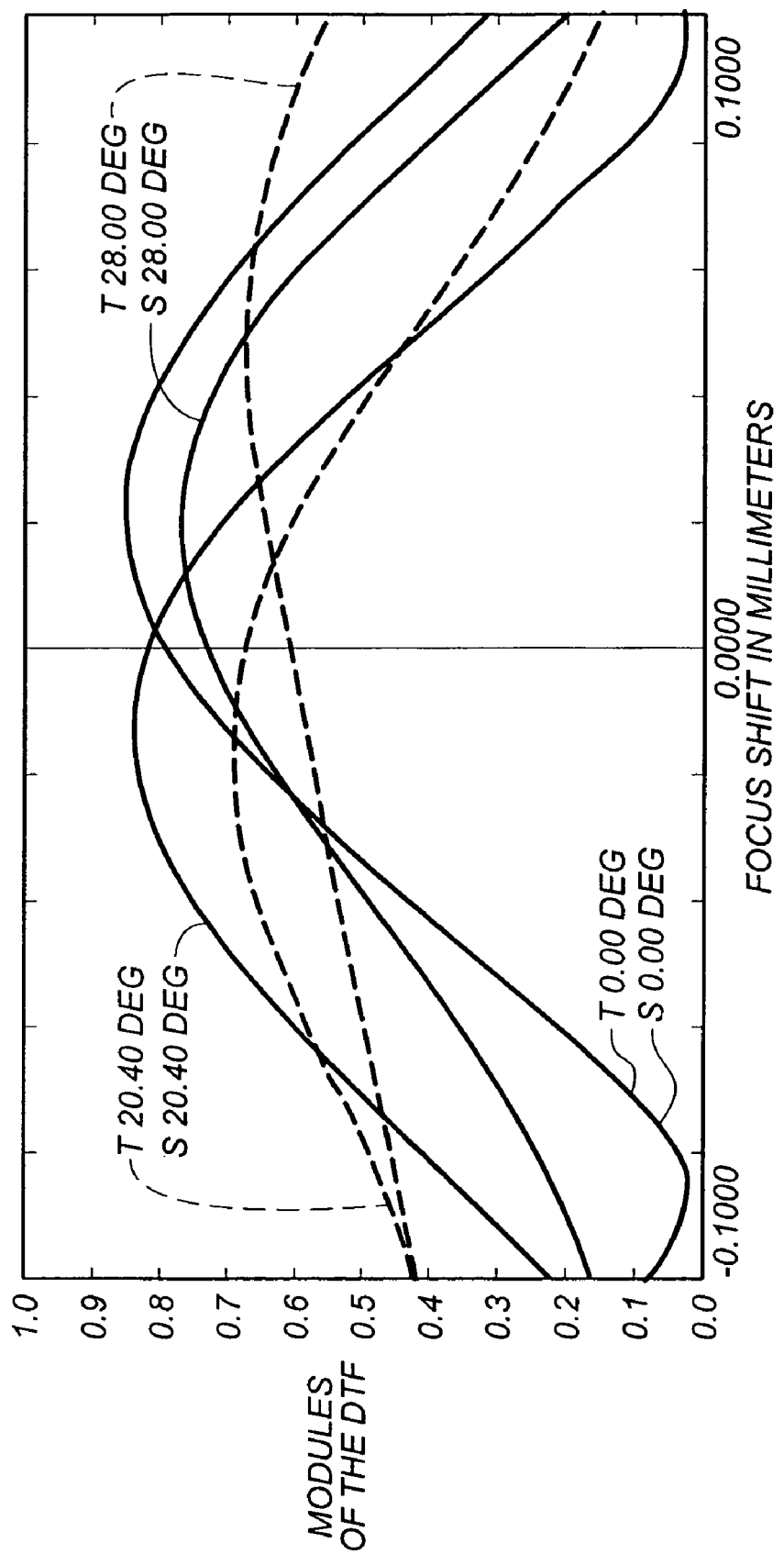
FIG. 15 is a through-focus MTF plot for the embodiment shown in FIG. 5.
Figure 16:
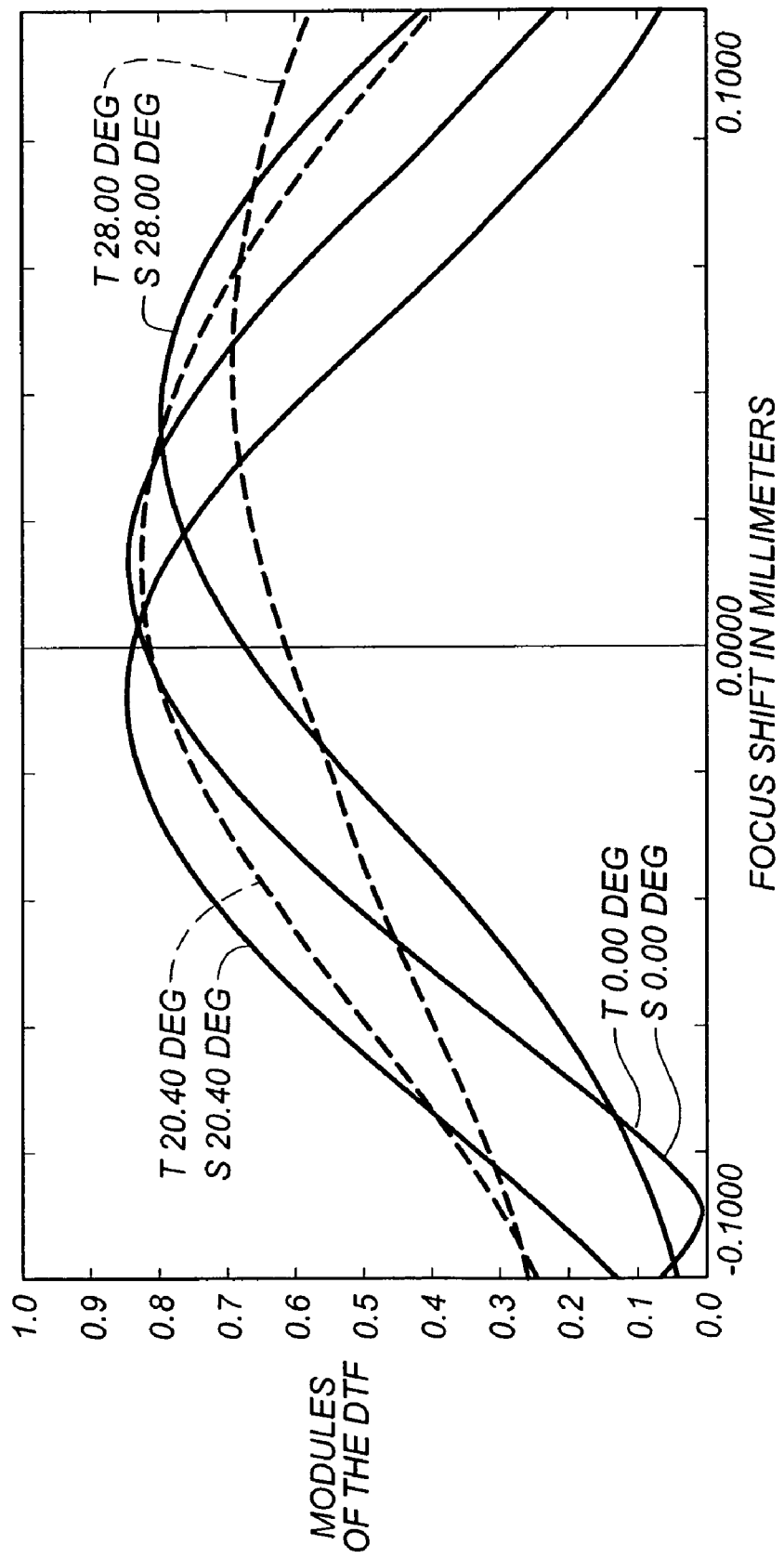
FIG. 16 is a through-focus MTF plot for the embodiment shown in FIG. 6.
Figure 17:
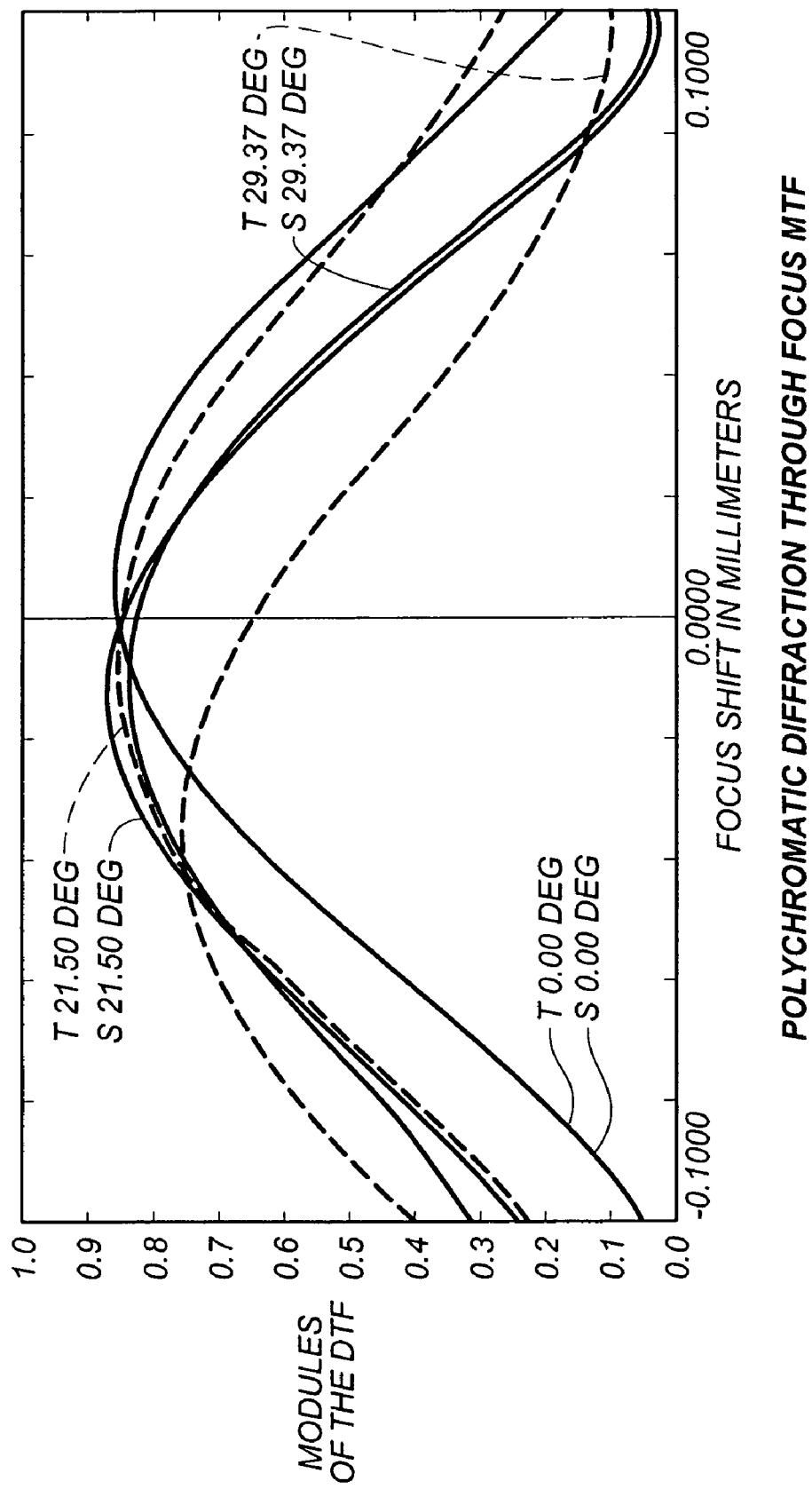
FIG. 17 is a through-focus MTF plot for the embodiment shown in FIG. 7.
Figure 18:
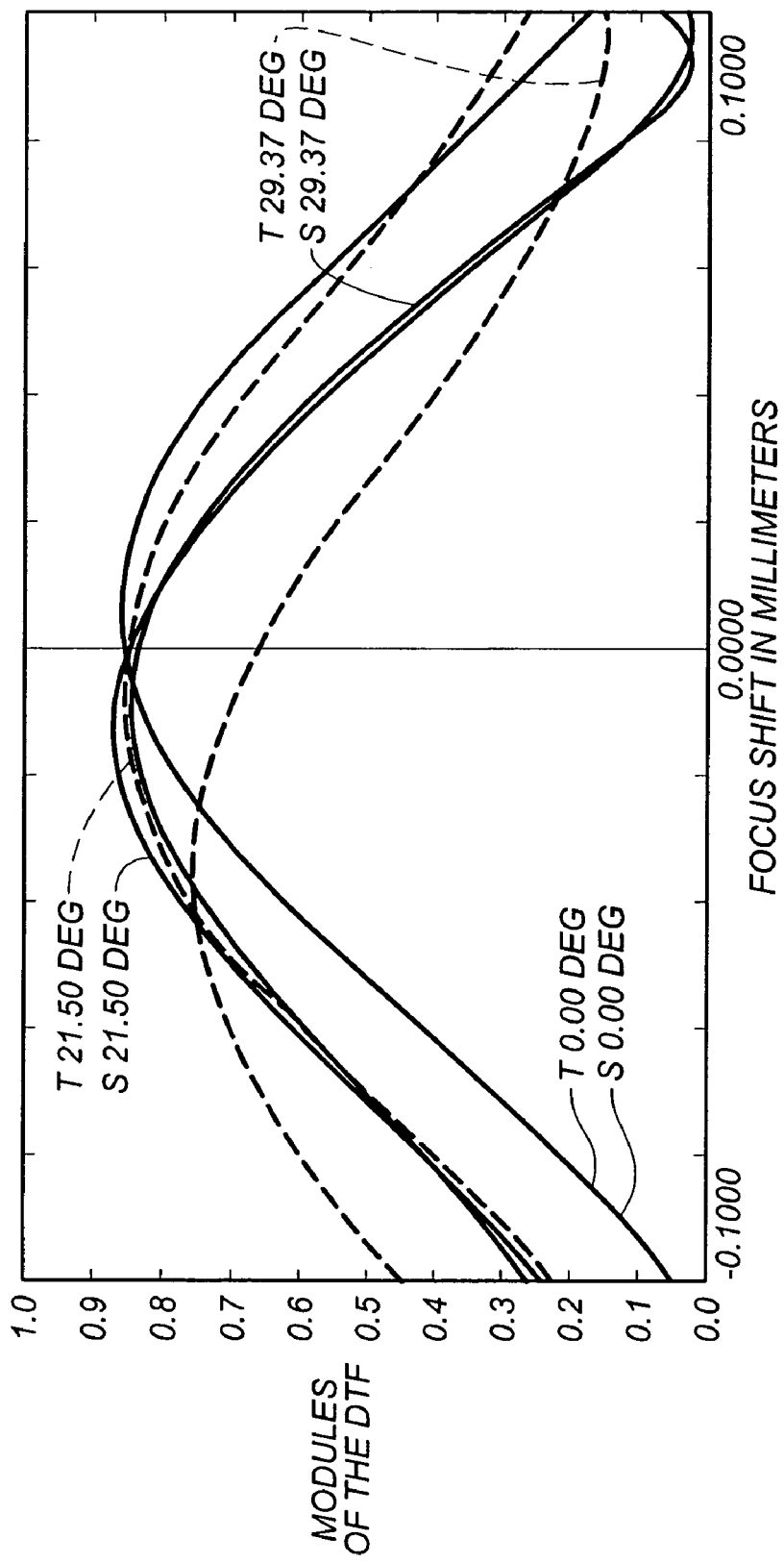
FIG. 18 is a through-focus MTF plot for the embodiment shown in FIG. 8.
Figure 19:
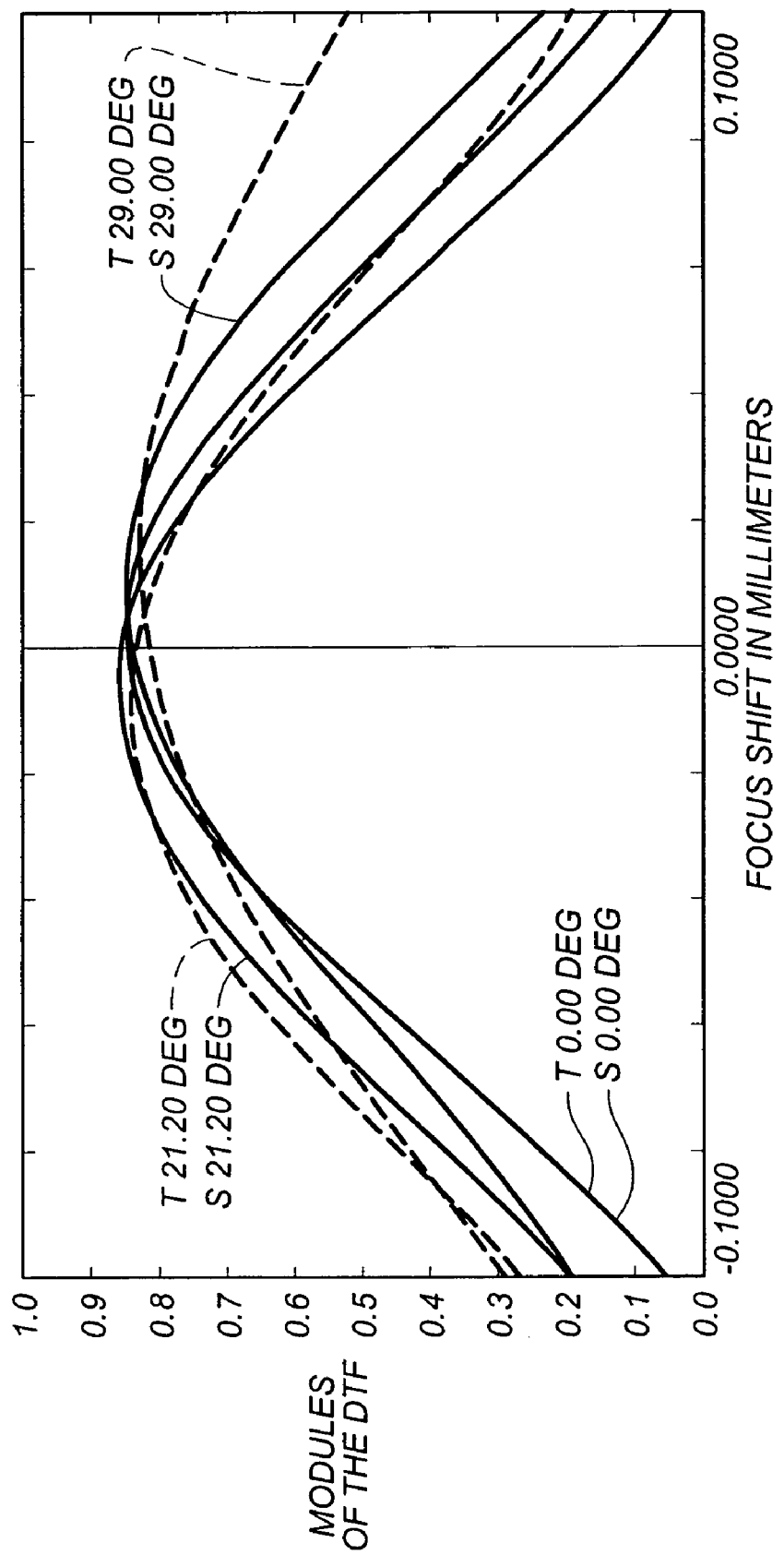
FIG. 19 is a through-focus MTF plot for the embodiment shown in FIG. 9.
Figure 20:
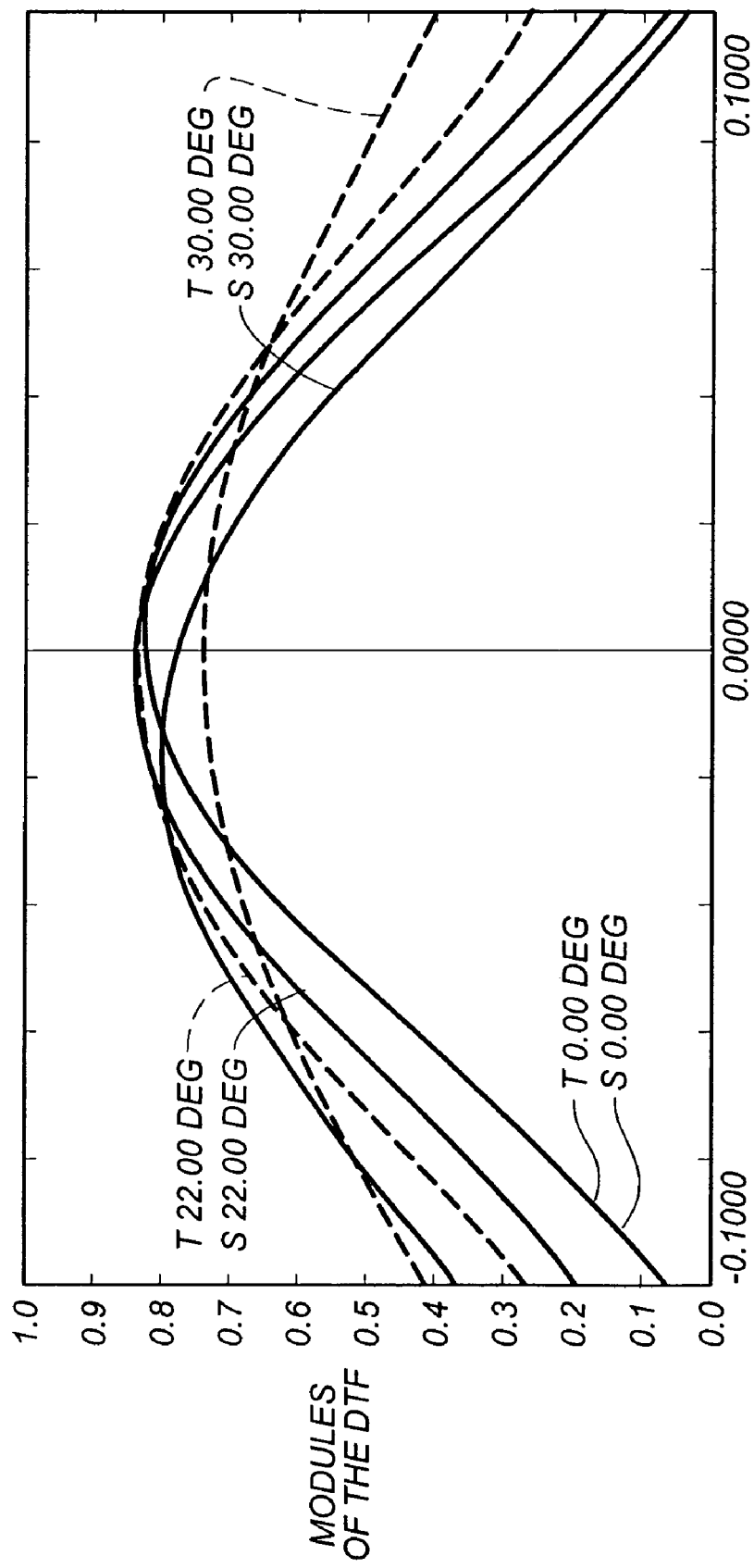
FIG. 20 is a through-focus MTF plot for the embodiment shown in FIG. 10.

Referring to FIG. 10 and Table 10, a tenth example embodiment is shown. Optical system 10 includes from object side 20 to image side 30 lens elements $E_1$, $E_2$, and $E_3$. Lens element $E_1$ is an aspheric singlet lens element having a positive power and a meniscus shape convex toward the object side 20. In this embodiment, the image side surface of lens element $E_1$ is aspheric; however either surface of lens element $E_1$ can be aspheric. Lens element $E_2$ is a bi-aspheric singlet lens element having a negative power and a meniscus shape concave toward the object side 20. Lens element $E_3$ is an aspheric singlet lens element having a positive power. In this embodiment, the image side surface of lens element $E_3$ is aspheric; however either surface of lens element $E_3$ can be aspheric.

Aperture stop 40 is located spaced apart from the object side surface of lens element $E_1$. Alternatively, aperture stop 40 can be located on the object side surface of lens element $E_1$. Baffle(s) 50, for example, a light vignetting aperture, is located between lens elements $E_1$ and $E_2$. Alternatively, baffle 50 can be positioned on a surface of either or both of lens element $E_1$ and $E_2$. Another baffle(s) 50, for example, a light vignetting aperture and/or a glare stop, is located on an image side surface of lens element $E_2$. Alternatively, this baffle(s) 50 can be located between lens elements $E_2$ and $E_3$ or on a surface of lens element $E_3$.

Lens elements $E_1$, $E_2$, and $E_3$ are each made from resin materials (e.g. plastic). When a resin material is used, the resin material can be of the type having a glass transition temperature, $T_g > 300°$ F. Nanocomposite optical material can also be used in any one or all of lens elements $E_1$, $E_2$, and $E_3$. Alternatively, lens element $E_1$, $E_2$, and/or $E_3$ can be made from very low dispersion material (for example, Abbe V-number, $V_d > 65$).

The optical system 10 described in FIG. 10 and Table 10 has a half field of view in object space of at least 25 degrees; a relative aperture of less than f/4; and a maximum index of refraction that is less than 1.60. Additionally, the optical system 10 satisfies the condition $L/f_0 < 1.25$, where L is the overall system length from the most distal vertex to the image plane and $f_0$ is the effective focal length of the lens. The optical system 10 has an overall system length L from the aperture stop 40 to light sensitive receiver 60 is about 7.13 mm and the effective focal length $f_0$ is about 6.0 mm, giving an $L/f_0$ ratio less than 1.20. This example embodiment covers a semi-field of view of at least 30 degrees, is F/2.8 or faster, has a relative illumination in the corner which is approximately 50% of the illumination at the center of the image (or more), has a maximum distortion magnitude less than 4%, and constrains the maximum chief ray angle at the light sensitive receiver 10 or sensor plane to less than about 22 degrees with respect to the sensor plane normal.

Referring back to FIGS. 1–10 and Tables 1–10, respectively, each spherical lens element described in the example embodiments is made from low index materials ($N_d<1.6$). As such, each spherical element can be made from either optical glass or resin material with only very minor curve changes to these elements while the other lens elements of optical system 10 remain fixed (if desired). This allows for an optical system 10 to be prototyped with, for example, two glass spherical lens elements and one plastic lens element. Then, in production, the two glass spherical lens elements can be replaced with spherical plastic elements with no changes to the other optical element(s) and minor or no changes to the mounting hardware (barrel, spacers, etc.).

In this manner, a manufacturer can switch between embodiments of the optical system 10 making use of the unique benefits of either optical glass elements or plastic resin elements, as desired, at any point in the product lifecycle, for minimal additional cost. Generally, for glass, the primary benefits would be 1) a more thermally stabile design, 2) a less-costly prototype, and 3) a quicker-to-produce prototype. For plastic resin, the primary benefits would be 1) a less-costly high volume production design and 2) a lighter weight design.

Lens elements $E_1$, $E_2$, and/or $E_3$ having an aspheric surface(s) of optical system 10 are typically made from resin materials. Alternatively, these elements can be made from glass; however, cost issues may prohibit this. Lens elements $E_1$, $E_2$, and/or $E_3$ having a spherical surface(s) of optical system 10 can be made from either low index glass or resin material as is desired.

Suitable light sensitive receivers 60 include, for example, charged coupled devices (CCDs) and complementary metal-oxide sensors (CMOS). Additionally, the optical system 10 described above is adapted to function with these types of light sensitive receivers (sensors) having active diagonal dimensions of less than about eight millimeters. Alternatively, the optical system 10 described above can be scaled either up or down so as to function with light sensitive receivers (sensors) having larger or smaller active diagonal dimensions.

The optical system 10 described above lends itself to a variety of film and/or electronic imaging applications. Optical system 10 is particularly suitable for use in consumer mobile imaging applications, for example, camera-enabled cellular phones and personal digital assistants (PDAs).

The through-focus MTF plots shown in FIGS. 11–20 are polychromatic (486 nm at 0.35, 538 nm at 1.00, and 597 nm at 0.50) for the embodiments depicted in FIGS. 1–10 and Tables 1–10, respectively. The MTF plots are shown for 33 line pairs/mm.

The invention has been described in detail with particular reference to certain preferred embodiments thereof, but it will be understood that variations and modifications can be effected within the scope of the invention.

Parts List

| | |
|---|---|
| 10 | Optical system |
| 15 | Optical Axis |
| 20 | Object Side |
| 30 | Image Side |
| 40 | Aperture Stop |
| 50 | Baffle(s) |
| 60 | Light Sensitive Receiver |
| 70 | Additional Element |
| $E_1$, $E_2$, and $E_3$ | Lens element |
| $R_1 \ldots R_N$ | Surface Radii |

TABLE 1

| SURF. | CLEAR AP. | RADIUS | THICKNESS | $N_d$ | $V_d$ |
|---|---|---|---|---|---|
| OBJ | INF | INF | INF | | |
| 1 | 0.899(1) | 1.484628 | 1.0480 | 1.517 | 64.2 |
| 2 | 0.701 | 3.87226 | 0.2052 | | |
| 3 | 0.670(2) | PLANO | 0.8341 | | |
| 4 | 0.841 | −1.050646(3) | 0.6998 | 1.590 | 30.8 |
| 5 | 1.334 | −1.709228(3) | 0.0808 | | |
| 6 | 2.305 | 4.370839 | 1.4786 | 1.530 | 55.9 |
| 7 | 2.403 | 22.94755 | 1.2229 | | |
| 8 | 2.645 | PLANO | 0.4060 | 1.517 | 64.2 |
| 9 | 2.703 | PLANO | 0.0250 | | |
| 10 | 2.709 | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1 + \sqrt{1 - (k+1)C^2 Y^2}} + DY^4 + EY^6 + FY^8 + GY^{10} + HY^{12} + IY^{14} + JY^{16}$$

| SURF. 4 | C = −0.951795<br>k = 0.000000 | D = 0.74240079E−02<br>E = 0.10314786E00<br>F = −0.28038367E00<br>G = −0.93836004E−01 | H = 0.5618976E00<br>I = 0.16700731E00<br>J = −0.90214939E00 |
|---|---|---|---|
| SURF. 5 | C = −0.585059<br>k = 0.000000 | D = 0.48190457E−01<br>E = −0.26627216E−01<br>F = 0.16146376E−01<br>G = 0.51990544E−02 | H = −0.29898661E−02<br>I = −0.2458555E−02<br>J = 0.10958537E−02 |

TABLE 2

| SURF. | CLEAR AP. | RADIUS | THICKNESS | $N_d$ | $V_d$ |
|---|---|---|---|---|---|
| OBJ | INF | INF | INF | | |
| 1 | 0.893(1) | 1.476838 | 1.0756 | 1.497 | 81.6 |
| 2 | 0.702 | 4.122071 | 0.1710 | | |
| 3 | 0.680(2) | PLANO | 0.8626 | | |
| 4 | 0.842 | −0.9384097(3) | 0.6563 | 1.590 | 30.8 |
| 5 | 1.294 | −1.458057(3) | 0.0989 | | |
| 6 | 2.239 | 4.379582 | 1.3959 | 1.530 | 55.9 |
| 7 | 2.340 | 22.64364 | 1.3088 | | |
| 8 | 2.620 | PLANO | 0.4060 | 1.517 | 64.2 |
| 9 | 2.690 | PLANO | 0.0250 | | |
| 10 | 2.700 | PLANO | | | |

NOTES:
1) APERTURE STOP
2) VIGNETTING APERTURE
3) ASPHERIC SURFACE DESCRIBED BY SAG EQUATION:

TABLE 2-continued $$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. | | | |
|---|---|---|---|
| SURF. 4 | C = −1.065633  k = 0.000000 | D = 0.90752938E−01  E = −0.75719461E−01  F = 0.15407556E00  G = −0.89984897E−02 | H = 0.10958098E00  I = −0.11614418E00  J = −0.88493986E−01 |
| SURF. 5 | C = −0.685844  k = 0.000000 | D = 0.58081303E−01  E = −0.18125923E−01  F = 0.20405245E−01  G = 0.75292315E−02 | H = −0.26990959E−02  I = −0.3983865E−02  J = 0.18216606E−02 |

TABLE 3

| SURF. | CLEAR AP. | RADIUS | THICKNESS | $N_d$ | $V_d$ |
|---|---|---|---|---|---|
| OBJ | INF | INF | INF | | |
| 1 | 0.919(1) | 1.376075(3) | 1.2964 | 1.530 | 55.9 |
| 2 | 0.702 | 2.472313(3) | 0.2841 | | |
| 3 | 0.700(2) | PLANO | 0.5129 | | |
| 4 | 0.874 | −1.421446 | 0.7083 | 1.590 | 30.8 |
| 5 | 1.394 | −3.015075 | 0.0929 | | |
| 6 | 2.190 | 3.894110(3) | 1.8301 | 1.530 | 55.9 |
| 7 | 2.560 | −100.1805(3) | 0.8372 | | |
| 8 | 2.689 | PLANO | 0.4060 | 1.517 | 64.2 |
| 9 | 2.718 | PLANO | 0.0250 | | |
| 10 | 2.721 | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. | | | |
|---|---|---|---|
| SURF. 1 | C = 0.7497196  k = 0.1708289 | D = 0.00000000  E = 0.00000000  F = 0.00000000  G = 0.00000000 | H = 0.00000000  I = 0.00000000  J = 0.00000000 |
| SURF. 2 | C = 0.4153024  k = 6.5910530 | D = 0.97584476E−01  E = −0.41616868E00  F = 0.11126273E01  G = −0.87165891E00 | H = 0.00000000  I = 0.00000000  J = 0.00000000 |
| SURF. 6 | C = 0.2567981  k = −8.2623730 | D = 0.21889224E−02  E = −0.28440338E−03  F = 0.58408327E−04  G = −0.23654137E−04 | H = 0.00000000  I = 0.00000000  J = 0.00000000 |
| SURF. 7 | C = −0.0099923  k = 0.0000000 | D = 0.47131521E−02  E = −0.24283270E−02  F = 0.27429091E−03  G = −0.24515189E−04 | H = 0.00000000  I = 0.00000000  J = 0.00000000 |

TABLE 4

| SURF. | CLEAR AP. | RADIUS | THICKNESS | $N_d$ | $V_d$ |
|---|---|---|---|---|---|
| OBJ | INF | INF | INF | | |
| 1 | 0.891(1) | 1.359797(3) | 0.9992 | 1.530 | 55.9 |
| 2 | 0.714 | 2.439054(3) | 0.2824 | | |
| 3 | 0.710(2) | PLANO | 0.7366 | | |
| 4 | 0.865 | −1.103848(3) | 0.7315 | 1.590 | 30.8 |
| 5 | 1.316 | −1.60816(3) | 0.0791 | | |
| 6 | 2.106 | 4.776113 | 1.4501 | 1.530 | 55.9 |
| 7 | 2.263 | 20.49335 | 1.2851 | | |
| 8 | 2.606 | PLANO | 0.4060 | 1.517 | 64.2 |
| 9 | 2.693 | PLANO | 0.0250 | | |
| 10 | 2.703 | PLANO | | | |

TABLE 4-continued

NOTES:
1) APERTURE STOP
2) VIGNETTING APERTURE
3) ASPHERIC SURFACE DESCRIBED BY SAG EQUATION:

$$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. | | | |
|---|---|---|---|
| SURF. 1 | C = 0.735404  k = 0.201923 | D = 0.00000000  E = 0.00000000  F = 0.00000000  G = 0.00000000 | H = 0.00000000  I = 0.00000000  J = 0.00000000 |
| SURF. 2 | C = 0.409995  k = 6.603307 | D = 0.00000000  E = 0.000000000  F = 0.000000000  G = 0.000000000 | H = 0.00000000  J = 0.00000000 |
| SURF. 4 | C = −0.905922  k = 0.1618255 | D = 0.00000000  E = 0.000000000  F = 0.000000000  G = 0.000000000 | H = 0.00000000  I = 0.00000000 |
| SURF. 5 | C = −0.6218287  k = −0.3796216 | D = 0.00000000  E = 0.000000000  F = 0.000000000  G = 0.000000000 | H = 0.00000000  I = 0.00000000  J = 0.00000000 |

TABLE 5

| SURF. | CLEAR AP. | RADIUS | THICKNESS | $N_d$ | $V_d$ |
|---|---|---|---|---|---|
| OBJ | INF | INF | INF | | |
| 1 | 0.885(1) | 1.359797(3) | 0.9992 | 1.530 | 56.0 |
| 2 | 0.713 | 2.439054(3) | 0.2824 | | |
| 3 | 0.710(2) | PLANO | 0.7366 | | |
| 4 | 0.866 | −1.103848(3) | 0.7315 | 1.560 | 32.0 |
| 5 | 1.314 | −1.60816(3) | 0.0791 | | |
| 6 | 2.090 | 4.776113 | 1.4501 | 1.530 | 56.0 |
| 7 | 2.248 | 20.49335 | 1.2150 | | |
| 8 | 2.574 | PLANO | 0.4060 | 1.517 | 64.2 |
| 9 | 2.664 | PLANO | 0.0250 | | |
| 10 | 2.673 | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. | | | |
|---|---|---|---|
| SURF. 1 | C = 0.735404  k = 0.201923 | D = 0.00000000  E = 0.00000000  F = 0.00000000  G = 0.00000000 | H = 0.00000000  I = 0.00000000  J = 0.00000000 |
| SURF. 2 | C = 0.409995  k = 6.603307 | D = 0.00000000  E = 0.000000000  F = 0.000000000  G = 0.000000000 | H = 0.00000000  J = 0.00000000 |
| SURF. 4 | C = −0.905922  k = 0.1618255 | D = 0.00000000  E = 0.000000000  F = 0.000000000  G = 0.000000000 | H = 0.00000000  I = 0.00000000  J = 0.00000000 |
| SURF. 5 | C = −0.6218287  k = −0.3796216 | D = 0.00000000  E = 0.000000000  F = 0.000000000  G = 0.000000000 | H = 0.00000000  I = 0.00000000  J = 0.00000000 |

TABLE 6

| SURF. | CLEAR AP. | RADIUS | THICKNESS | $N_d$ | $V_d$ |
|---|---|---|---|---|---|
| OBJ | INF | INF | INF | | |
| 1 | 0.912(1) | 1.372571(3) | 1.1998 | 1.530 | 55.9 |
| 2 | 0.702 | 2.521081(3) | 0.2651 | | |
| 3 | 0.700(2) | PLANO | 0.6574 | | |
| 4 | 0.875 | −1.180721 | 0.8072 | 1.590 | 30.8 |
| 5 | 1.395 | −1.900876(3) | 0.0979 | | |
| 6 | 2.222 | 4.776188(3) | 1.5097 | 1.530 | 55.9 |
| 7 | 2.530 | −100.073(3) | 0.9695 | | |
| 8 | 2.688 | PLANO | 0.4060 | 1.517 | 64.2 |
| 9 | 2.721 | PLANO | 0.0250 | | |
| 10 | 2.724 | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12} + IY^{14} + JY^{16}$$

| SURF. 1 | C = 0.7285598<br>k = 0.1488323 | D = 0.00000000<br>E = 0.00000000<br>F = 0.00000000<br>G = 0.00000000 | H = 0.00000000<br>I = 0.00000000<br>J = 0.00000000 |
|---|---|---|---|
| SURF. 2 | C = 0.3966552<br>k = 5.7201660 | D = 0.7911972E−01<br>E = −0.30868440E00<br>F = 0.89123850E00<br>G = −0.68632905E00 | H = 0.00000000<br>I = 0.00000000<br>J = 0.00000000 |
| SURF. 5 | C = 0.5260732<br>k = 0.0000000 | D = 0.94505070E−02<br>E = 0.85824134E−04<br>F = 0.68959484E−03<br>G = 0.54915085E−03 | H = 0.00000000<br>I = 0.00000000<br>J = 0.00000000 |
| SURF. 6 | C = 0.2093720<br>k = −5.7449510 | D = 0.10169544E−02<br>E = −0.29482389E−03<br>F = 0.70745860E−04<br>G = −0.23252482E−04 | H = 0.00000000<br>I = 0.00000000<br>J = 0.00000000 |
| SURF. 7 | C = −0.0099927<br>k = 0.0000000 | D = 0.4427226E−02<br>E = −0.21136467E−02<br>F = 0.21423077E−03<br>G = −0.24599791E−04 | H = 0.00000000<br>I = 0.00000000<br>J = 0.00000000 |

TABLE 7

| SURF. | CLEAR AP. | RADIUS | THICKNESS | $N_d$ | $V_d$ |
|---|---|---|---|---|---|
| OBJ | INF | INF | INF | | |
| 1 | 0.927(1) | 1.662800 | 1.1590 | 1.530 | 55.9 |
| 2 | 0.774 | 5.720000(3) | 0.2000 | | |
| 3 | 0.752(2) | PLANO | 0.7570 | | |
| 4 | 0.897 | −1.078370(3) | 0.6980 | 1.590 | 30.8 |
| 5 | 1.366 | −1.541550(3) | 0.0850 | | |
| 6 | 2.440(2) | 8.132540 | 1.6720 | 1.530 | 55.9 |
| 7 | 2.752 | −13.63016(3) | 1.2700 | | |
| 8 | 3.040 | PLANO | 0.4000 | 1.517 | 64.2 |
| 9 | 3.103 | PLANO | 0.0250 | | |
| 10 | | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12} + IY^{14} + JY^{16}$$

| SURF. 2 | C = 0.1748252<br>k = 19.206420 | D = −.10243737E−01<br>E = −0.92708580E−02<br>F = −0.12141643E−01<br>G = −0.47005287E−02 | H = 0.00000000<br>I = 0.00000000<br>J = 0.00000000 |
|---|---|---|---|
| SURF. 4 | C = −0.9273255<br>k = 0.0000000 | D = 0.44252743E−01<br>E = 0.68139433E−01<br>F = 0.24501737E−01<br>G = −0.59331288E−01 | H = 0.35363612E−03<br>I = 0.35807664E−01<br>J = 0.00000000 |
| SURF. 5 | C = −0.6486977<br>k = 0.0000000 | D = 0.59612810E−01<br>E = 0.16783025E−01<br>F = 0.1574746E−01<br>G = −0.30817803E−02 | H = −0.3108184E−02<br>I = 0.15326313E−02<br>J = 0.00000000 |
| SURF. 7 | C = 0.07336671<br>k = 0.0000000 | D = −0.18042455E−01<br>E = 0.14764062E−02<br>F = −0.17633960E−03<br>G = 0.70521326E−05 | H = 0.00000000<br>I = 0.00000000<br>J = 0.00000000 |

TABLE 8

| SURF. | CLEAR AP. | RADIUS | THICKNESS | $N_d$ | $V_d$ |
|---|---|---|---|---|---|
| OBJ | INF | INF | INF | | |
| 1 | 0.927(1) | 1.662800 | 1.1590 | 1.530 | 55.9 |
| 2 | 0.774 | 5.720000(3) | 0.2000 | | |
| 3 | 0.752(2) | PLANO | 0.7570 | | |
| 4 | 0.873 | −1.078370(3) | 0.6980 | 1.590 | 30.8 |
| 5 | 1.310(2) | −1.541550(3) | 0.0850 | | |
| 6 | 2.462 | 8.132540 | 1.6720 | 1.530 | 55.9 |
| 7 | 2.751(2) | −13.63016(3) | 1.2700 | | |
| 8 | 3.041 | PLANO | 0.4000 | 1.517 | 64.2 |
| 9 | 3.103 | PLANO | 0.0250 | | |
| 10 | | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12} + IY^{14} + JY^{16}$$

| SURF. 2 | C = 0.1748252<br>k = 19.206420 | D = −.10243737E−01<br>E = −0.92708580E−02<br>F = −0.12141643E−01<br>G = −0.47005287E−02 | H = 0.00000000<br>I = 0.00000000<br>J = 0.00000000 |
|---|---|---|---|
| SURF. 4 | C = −0.9273255<br>k = 0.0000000 | D = 0.44252743E−01<br>E = 0.68139433E−01<br>F = 0.24501737E−01<br>G = −0.59331288E−01 | H = 0.35363612E−03<br>I = 0.35807664E−01<br>J = 0.00000000 |
| SURF. 5 | C = −0.6486977<br>k = 0.0000000 | D = 0.59612810E−01<br>E = 0.16783025E−01<br>F = 0.1574746E−01<br>G = −0.30817803E−02 | H = −0.3108184E−02<br>I = 0.15326313E−02<br>J = 0.00000000 |
| SURF. 7 | C = 0.07336671<br>k = 0.0000000 | D = −0.18042455E−01<br>E = 0.14764062E−02<br>F = −0.17633960E−03<br>G = 0.70521326E−05 | H = 0.00000000<br>I = 0.00000000<br>J = 0.00000000 |

TABLE 9

| SURF. | CLEAR AP. | RADIUS | THICKNESS | $N_d$ | $V_d$ |
|---|---|---|---|---|---|
| OBJ | INF | INF | INF | | |
| STO | 0.981(1) | INF | 0.050 | | |
| 2 | 1.003 | 1.66280 | 1.159 | 1.530 | 55.9 |
| 3 | 0.822 | 5.72000(4) | 0.153 | | |
| 4 | 0.800(2) | INF | 0.076 | | |
| 5 | 0.800(2) | INF | 0.728 | | |
| 6 | 0.907 | −1.11970(4) | 0.698 | 1.583 | 30.1 |
| 7 | 1.362 | −1.61415(4) | −0.316 | | |
| 8 | 1.431(3) | INF | 0.401 | | |

TABLE 9-continued

| SURF. | CLEAR AP. | RADIUS | THICKNESS | $N_d$ | $V_d$ |
|---|---|---|---|---|---|
| 9 | 2.155 | 8.13254 | 1.765 | 1.530 | 55.9 |
| 10 | 2.578 | 9.83558(4) | 1.273 | | |
| 11 | 2.900 | PLANO | 0.300 | 1.523 | 58.6 |
| 12 | 2.943 | PLANO | 0.025 | | |
| IMA | 2.949 | PLANO | | | |

NOTES:
1) APERTURE STOP
2) VIGNETTING APERTURE
3) GLARE STOP
4) ASPHERIC SURFACE DESCRIBED BY SAG EQUATION:

$$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. 3 | C = 0.1748252<br>k = 19.206420 | D = −0.10243737E−01<br>E = −0.92708580E−02<br>F = −0.12141643E−01<br>G = −0.47005287E−02 | H = 0.00000000<br>I = 0.00000000<br>J = 0.00000000 |
|---|---|---|---|
| SURF. 6 | C = −0.8930964<br>k = 0.0000000 | D = 0.41014658E−01<br>E = 0.81738929E−01<br>F = −0.31897343E−00<br>G = 0.80497156E−00 | H = −0.86008994E−00<br>I = 0.30775966E−00<br>J = 0.00000000 |
| SURF. 7 | C = −0.6195211<br>k = 0.0000000 | D = 0.64314342E−01<br>E = −0.53249786E−02<br>F = 0.37429655E−01<br>G = −0.19403391E−01 | H = 0.3905023E−02<br>I = 0.3341013E−04<br>J = 0.00000000 |
| SURF. 10 | C = 0.1016717<br>k = 0.0000000 | D = −0.18420485E−01<br>E = 0.14508599E−02<br>F = −0.17794895E−03<br>G = 0.70228893E−05 | H = 0.20077432E−07<br>I = 0.56230036E−08<br>J = 0.599365E−09 |

TABLE 10

| SURF. | CLEAR AP. | RADIUS | THICKNESS | $N_d$ | $V_d$ |
|---|---|---|---|---|---|
| OBJ | INF | INF | INF | | |
| STO | 1.110(1) | INF | 0.050 | | |
| 2 | 1.137 | 1.88232 | 1.312 | 1.530 | 55.9 |
| 3 | 0.931 | 6.47514(3) | 0.173 | | |
| 4 | 0.905(2) | INF | 0.076 | | |
| 5 | 0.905(2) | INF | 0.834 | | |
| 6 | 1.024 | −1.26752(3) | 0.790 | 1.583 | 30.1 |
| 7 | 1.549 | −1.82715(3) | −0.367 | | |
| 8 | 1.630(2) | INF | 0.463 | | |
| 9 | 2.719 | 9.20618 | 2.022 | 1.530 | 55.9 |
| 10 | 3.130 | 11.13405(3) | 1.453 | | |
| 11 | 3.417 | PLANO | 0.300 | 1.523 | 58.6 |
| 12 | 3.447 | PLANO | 0.025 | | |
| IMA | 3.452 | PLANO | | | |

NOTES:
1) APERTURE STOP
2) VIGNETTING APERTURE
3) ASPHERIC SURFACE DESCRIBED BY SAG EQUATION:

$$X(Y) = \frac{CY^2}{1+\sqrt{1-(k+1)C^2Y^2}} + DY^4 + EY^6 + FY^8 + GY^{10} + HY^{12} + IY^{14} + JY^{16}$$

| SURF. 3 | C = 0.1544368<br>k = 19.206420 | D = −0.70615316E−02<br>E = −0.49871689E−02<br>F = −0.50968902E−02<br>G = −0.15398137E−02 | H = 0.00000000<br>I = 0.00000000<br>J = 0.00000000 |
|---|---|---|---|
| SURF. 6 | C = −0.7889422<br>k = 0.0000000 | D = 0.28273501E−01<br>E = 0.43970671E−01<br>F = −0.13390053E−00<br>G = 0.26369506E−00 | H = −0.21986646E−00<br>I = 0.61393227E−01<br>J = 0.00000000 |

TABLE 10-continued

| SURF. | CLEAR AP. | RADIUS | THICKNESS | $N_d$ | $V_d$ |
|---|---|---|---|---|---|
| SURF. 7 | C = −0.5472705<br>k = 0.0000000 | D = 0.44335164E−01<br>E = −0.2864521E−02<br>F = 0.1571244E−01<br>G = −0.63562225E−02 | H = 0.9982486E−03<br>I = 0.66647972E−05<br>J = 0.00000000 |
| SURF. 10 | C = 0.0898146<br>k = 0.0000000 | D = −0.12698182E−01<br>E = 0.78047612E−03<br>F = −0.74700454E−04<br>G = 0.23005797E−05 | H = 0.51324328E−08<br>I = 0.11217011E−08<br>J = 0.93302613E−10 |

The invention claimed is:

1. An optical system comprising:
   a first lens element having a positive power, a meniscus shape, and an object side surface, the object side surface of the first lens element being convex toward the object side;
   a second lens element having a negative power, a meniscus shape, and an object side surface, the object side surface of the second lens element being concave toward the object side;
   a third lens element having a positive power, the first, second, and third lens elements being in order from an object side to an image side of the optical system; and
   an aperture stop positioned on an object side of the first lens element, wherein the positive power of the first lens element is stronger than the positive power of the third lens element.

2. The optical system according to claim 1, wherein the first lens element is a singlet.

3. The optical system according to claim 1, wherein the aperture stop is positioned on the object side surface of the first lens element.

4. The optical system according to claim 1, further comprising:
   a light vignetting aperture located between the first and second lens elements.

5. The optical system according to claim 1, wherein the first, second, and third lens elements are made from resin materials.

6. The optical system according to claim 1, the optical system having an effective focal length $f_0$, a total length L defining the distance between the vertex of the object side surface of the first lens element and an image plane located at an air equivalent back focus, wherein the optical system satisfies the condition $L/f_0 < 1.20$.

7. The optical system according claim 6, wherein the first lens element is made from a material having an Abbe V-number, $V_d > 65$.

8. The optical system according to claim 1, wherein the optical system has a half field of view in object space of at least 25 degrees.

9. The optical system according to claim 1, wherein the optical system has a relative aperture of less than f/4.

10. The optical system according to claim 1, wherein all of the lens elements have an index of refraction of less than 1.60.

11. The optical system according to claim 1, wherein the first lens element is made from a material having an Abbe V-number, $V_d > 65$.

12. The optical system according to claim 1, wherein at least one of the lens elements is made from a resin material having a glass transition temperature, $T_g > 300°$ F.

13. The optical system according to claim 1, wherein at least one of the lens elements is made from a nanocomposite optical material.

14. The optical system according to claim 1, wherein the first lens element is spherical, the second lens element is aspheric, and the third lens element is spherical.

15. The optical system according to claim 1, wherein the first lens element is spherical, the second lens element is bi-aspheric, and the third lens element is spherical.

16. The optical system according to claim 15, wherein the first lens element is made from a glass, the second lens element is made from a resin material, and the third lens element is made from a glass.

17. The optical system according to claim 15, wherein the first lens element is made from a glass, the second lens element is made from a resin material, and the third lens element is made from a resin material.

18. The optical system according to claim 15, wherein the first lens element is made from a resin material, the second lens element is made from a resin material, and the third lens element is made from a glass.

19. The optical system according to claim 15, wherein the first, second, and third lens elements are made from resin materials.

20. The optical system according to claim 1, wherein the first lens element is aspheric, the second lens element is spherical, and the third lens element is aspheric.

21. The optical system according to claim 20, wherein the first lens element is made from a resin material, the second lens element is made from a glass, and the third lens element is made from a resin material.

22. The optical system according to claim 20, wherein the first, second, and third lens elements are made from resin materials.

23. The optical system according to claim 1, wherein the first lens element is aspheric, the second lens element is aspheric, and the third lens element is spherical.

24. The optical system according to claim 23, wherein the first lens element is made from a resin material, the second lens element is made from a resin material, and the third lens element is made from a glass.

25. The optical system according to claim 23, wherein the first, second, and third lens elements are made from resin materials.

26. The optical system according to claim 1, wherein the first lens element is aspheric, the second lens element is aspheric, and the third lens element is aspheric.

27. The optical system according to claim 26, wherein the first, second, and third lens elements are made from resin materials.

28. The optical system according to claim 1, wherein the maximum chief ray angle in air with respect to the image surface normal is less than 20°, where chief rays are defined as rays that pass through the center of the aperture stop.

29. An optical system comprising:
   a first lens element having a positive power, a meniscus shape, and an object side surface, the object side surface of the first lens element being convex toward the object side;
   a second lens element having a negative power, a meniscus shape, and an object side surface, the object side surface of the second lens element being concave toward the object side;
   a third lens element having a positive power, the first, second, and third lens elements being in order from an object side to an image side of the optical system;
   an aperture stop positioned on an object side of the first lens element; and
   a light vignetting aperture located between at least one of the first and second lens elements, and the second and third lens elements.

30. An optical system comprising in order from an object side to and image side:
   a first lens element having a positive power, a meniscus shape, and an object side surface, the object side surface of the first lens element being convex toward the object side;
   a second lens element having a negative power, a meniscus shape, and an object side surface, the object side surface of the second lens element being concave toward the object side;
   a third lens element having a positive power, the first, second, and third lens elements being in order from an object side to an image side of the optical system; and
   an aperture stop positioned on an object side of the first lens element, the optical system having an effective focal length $f_0$, a total length L defining the distance between the vertex of the object side surface of the first lens element and an image plane located at an air equivalent back focus, wherein the optical system satisfies the condition $L/f_0 < 1.20$.

* * * * *